US012615504B2

(12) United States Patent
Dhiman et al.

(10) Patent No.: US 12,615,504 B2
(45) Date of Patent: Apr. 28, 2026

(54) MANAGING PAGING RESTRICTIONS IN A MULTI-SIM USER EQUIPMENT IN A WIRELESS NETWORK

(71) Applicant: SAMSUNG ELECTRONICS CO., LTD., Suwon-si (KR)

(72) Inventors: Manvir Singh Dhiman, Bangalore (IN); Arijit Sen, Bangalore (IN); Aman Agarwal, Bangalore (IN); Jagadeesh Gandikota, Bangalore (IN); Kailash Kumar Jha, Bangalore (IN); Koustav Roy, Bangalore (IN); Ravi Pandappa Kamaladinni, Bangalore (IN); Danish Ehsan Hashmi, Bangalore (IN); Lalith Kumar, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 440 days.

(21) Appl. No.: 18/320,472

(22) Filed: May 19, 2023

(65) Prior Publication Data
US 2023/0379691 A1 Nov. 23, 2023

Related U.S. Application Data

(63) Continuation of application No. PCT/KR2023/006792, filed on May 18, 2023.

(30) Foreign Application Priority Data

May 19, 2022 (IN) ............................. 202241028837
Mar. 27, 2023 (IN) ............................. 202241028837

(51) Int. Cl.
*H04W 8/18* (2009.01)
*H04W 4/12* (2009.01)
*H04W 68/02* (2009.01)

(52) U.S. Cl.
CPC ............. *H04W 8/183* (2013.01); *H04W 4/12* (2013.01); *H04W 68/02* (2013.01)

(58) Field of Classification Search
CPC ........ H04W 8/183; H04W 4/12; H04W 68/02
See application file for complete search history.

(56) References Cited

U.S. PATENT DOCUMENTS

2013/0210484 A1 8/2013 Jeenagala et al.
2018/0115978 A1 4/2018 Shi et al.
(Continued)

FOREIGN PATENT DOCUMENTS

CN 113678524 A 11/2021
EP 4161176 A1 * 4/2023 ............ H04W 64/00
(Continued)

OTHER PUBLICATIONS

3rd Generation Partnership Project, General Packet Radio Service (GPRS) enhancements for Evolved Universal Terrestrial Radio Access Network (E-UTRAN) access, 3GPP TS 23.401, Mar. 2023, 454 pages, V18 1.0, Release 18.
(Continued)

*Primary Examiner* — Elton Williams
(74) *Attorney, Agent, or Firm* — Nixon & Vanderhye, P.C.

(57) ABSTRACT
An example a method for managing paging restrictions in a wireless network includes detecting, by a UE, whether a first subscriber identity module (SIM) is configured for a dedicated data subscription (DDS). The method further includes detecting, by the UE, an occurrence of a trigger condition in connection with at least one of the first SIM and at least one second SIM and enabling, by the UE, a paging restriction to the at least one second SIM based on the occurrence of the predetermined trigger condition.

20 Claims, 32 Drawing Sheets

(56) References Cited

U.S. PATENT DOCUMENTS

| | | | |
|---|---|---|---|
| 2022/0053448 A1 | 2/2022 | Velev | |
| 2022/0303869 A1* | 9/2022 | Paradkar | H04W 76/15 |
| 2024/0251382 A1* | 7/2024 | Ozturk | H04W 8/183 |

FOREIGN PATENT DOCUMENTS

| | | | |
|---|---|---|---|
| KR | 20210098845 A | 8/2021 | |
| WO | 2017136078 A1 | 8/2017 | |
| WO | 2020209620 A1 | 10/2020 | |
| WO | 2021/015502 | 1/2021 | |
| WO | 2021083801 A1 | 5/2021 | |
| WO | 2021228243 A1 | 11/2021 | |
| WO | 2022006762 A1 | 1/2022 | |
| WO | 2022025717 A1 | 2/2022 | |

OTHER PUBLICATIONS

3rd Generation Partnership Project, Non-Access-Stratum (NAS) protocol for Evolved Packet System (EPS), 3GPP TS 24.301, Mar. 2023, 622 pages, v18.2.1., Release 18.
Search Report dated Aug. 17, 2023 in International Patent Application No. PCT/KR2023/006792.
Written Opinion dated Aug. 17, 2023 in International Patent Application No. PCT/KR2023/006792.
Charter Communications, "Remaining Issues for MUSIM Network Switching," R2-2110189, 3GPP TSG-RAN WG2 Meeting #116 Electronic, Oct. 22, 2021.
Vivo, "[post112-e][256][Multi-SIM] Network switching details (vivo)," R2-2100474, 3GPP TSG-RAN WG2 Meeting #113-e, Jan. 15, 2021.
Office Action dated Mar. 13, 2024 in IN Application No. 202241028837 and English-language translation.

* cited by examiner

Paging for MT services
(voice calls or
SMS/MMS) on SIM 2
(104)

(300)

DDS

High priority 5G
APPs/services
running on SIM 1
(103)

SIM 2
(101)

SIM 1
(100)

RF tune-away
(102)

(1300)

MANAGING PAGING RESTRICTIONS IN A MULTI-SIM USER EQUIPMENT IN A WIRELESS NETWORK

CROSS-REFERENCE TO RELATED APPLICATIONS

This application is a continuation of PCT/KR2023/006792, designating the United States, filed May 18, 2023, in the Korean Intellectual Property Receiving Office, which claims priority to Indian Provisional Patent Application No. 202241028837, filed on May 19, 2022, in the Indian Patent Office and to Indian Complete Patent Application No. 202241028837, filed on Mar. 27, 2023, in the Indian Patent Office. The disclosures of each of these applications are incorporated herein in their entireties.

BACKGROUND

Field

The disclosure relates to a user equipment, and, for example, to user equipment and methods for managing paging restrictions.

Description of Related Art

Generally, in dual-subscriber identity module (SIM) dual-standby (DSDS) devices, radio frequency (RF) resources are utilized only on one SIM card or a protocol stack at a time based on priority of a service (as determined by a RF Module) running between the SIMs. For example, a call is given higher priority over data, so the RF resources would be occupied by a calling SIM instead of a data SIM if call and data are running on different SIM cards. However, the device needs to periodically monitor paging on other SIM (Ex: SIM2) for mobile terminating (MT) services when the RF resources are on SIM1 or vice versa. When the RF tune-away happens from one SIM to other SIM (Ex: SIM1 to SIM2), the service running on the SIM1 may be suspended or interrupted or halted with poor latency.

Further, the RF tune-away between SIMs frequently leads to high power consumption and usage of resources which may lead to device over-heating or higher battery consumption.

Thus, it would be desirable to address the above mentioned disadvantages or other shortcomings or at least provide a useful alternative to avoid interruption of critical applications/services and avoid unnecessary RF Tune-Away between SIMs.

Example embodiments of the disclosure may manage paging restrictions in a multi-SIM user equipment (UE) to provide a better and seamless user experience.

Example embodiments of the disclosure may enable paging restriction to at least one second SIM based on occurrence of a predetermined trigger condition that can enhance battery life by reducing the power consumption.

Example embodiments of the disclosure may initiate a timer in parallel to enabling a paging restriction to at least one second SIM for a particular time period and disable the paging restriction on the at least one second SIM when the predetermined trigger condition does not persist after the expiry of the timer.

SUMMARY

In an example embodiment, a method for managing paging restrictions in a multi-SIM user equipment (UE) in a wireless network may include detecting, by the UE, whether a first SIM is configured for a dedicated data subscription (DDS); detecting, by the UE, an occurrence of a predetermined trigger condition in connection with at least one of the first SIM and at least one second SIM; enabling, by the UE, a paging restriction to the at least one second SIM based on the occurrence of the predetermined trigger condition.

In an example embodiment, the method may include initiating, by the UE, a timer in parallel to enabling the paging restriction to the at least one second SIM for a particular time period; and disabling, by the UE, the paging restriction on the at least one second SIM when the predetermined trigger condition does not persist after the expiry of the timer.

In an example embodiment, the predetermined trigger condition may include when critical data services or application are running on the first SIM and when paging is not restricted for mobile terminal (MT) services on the at least one second SIM.

In an example embodiment, the critical data services or application may include at least one of office meeting applications, banking transaction, banking transaction applications, gaming services, hotspot applications, hotspot services, 4K streaming applications, voice over internet protocol (VoIP) app-based calls, low-latency based application, data-oriented application, and the like.

In an example embodiment, the MT services may include voice calls, short messaging service (SMS), multimedia messaging service (MMS), integrated management system (IMS) and the like.

In an example embodiment, the method may include determining, by the UE, whether the paging on the at least one second SIM of the UE is restricted; determining whether the timer for restricting paging on the at least one second SIM is expired when the paging on the at least one second SIM of the UE is restricted; detecting the critical data services or application running in the UE on the first SIM and the paging is not restricted on the at least one second SIM of the UE; and initiating the timer for restricting paging on the at least one second SIM.

In an example embodiment, the method may include determining, by the UE, whether the UE and a network supports paging restriction feature; determining, by the UE, whether the critical data services or application is running in the UE and the paging on the at least one second SIM of the UE is not restricted when the UE and a network supports paging restriction feature; and disabling paging restrictions when the UE and the network are not supporting the paging restriction feature.

In an example embodiment, the method may include determining, by the UE, whether the critical data services or application is paused or minimized; initiating, by the UE, a timer for restricting paging on the at least one second SIM when the critical application is not paused or not minimized; determining, by the UE, whether the timer for restricting paging on the at least one second SIM is expired and the critical application is paused or minimized; removing paging restrictions from the at least one second SIM when the timer for restricting paging on the at least one second SIM is expired and the critical application is paused or minimized; and enabling paging restriction on the at least one second SIM when the timer for restricting paging on the at least one second SIM is not expired or the critical application is not paused or not minimized.

In an example embodiment, the method may include receiving, by the UE, a selection of at least one application from a user in the user interface of the UE, wherein the UE considers the selected at least one application as the critical data services or application; determining, by the UE, whether the selected at least one application is open; initiating restriction of paging on the at least one second SIM when the selected at least one application is open; and disabling paging restrictions on the at least one second SIM when the selected at least one application is not open.

In an example embodiment, the method may include determining, by the UE, at least one of data-heavy applications running on device, low latency applications running on the UE through the first SIM, high priority applications running on the UE through the first SIM, the UE having Low Battery, the UE having power saving enabled, or the UE being over heated; determining, by the UE, the paging restriction is not enabled; detecting, by the UE, whether the predetermined trigger condition is meet; and enabling paging restriction to the at least one second SIM when the predetermined trigger condition is met.

In an example embodiment, the paging restriction provides at least one of low latency, high data throughput and reduced frequency of RF tune-away between the Multi SIMs.

In an example embodiment, the UE may indicate paging restriction information to the network through the at least one second SIM in the form of service request or registration request message to stop receiving the MT services in the second SIM.

In an example embodiment, the method may include identifying, by the UE, the critical data services or application running on the UE based on an artificial intelligence (AI)-based engine; determining, by the UE, whether the UE is connected to a Wi-Fi network; enabling, by the UE, the paging restriction to at least one of the first SIM and the at least one second SIM when the UE is connected to the Wi-Fi network, wherein the UE comprises at least one of the first SIM and the at least one second SIM.

In an example embodiment, a UE for managing paging restrictions in the wireless network may include a memory, a processor and a paging controller. The paging controller may be configured to detect whether the first SIM is configured for DDS; detect an occurrence of a predetermined trigger condition in connection with at least one of a first SIM and at least one second SIM; enable the paging restriction to the at least one second SIM based on the occurrence of the predetermined trigger condition.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

The above and/or other aspects of the disclosure will be more apparent by describing certain embodiments of the disclosure with reference to the accompanying drawings, in which.

US 12,615,504 B2

5

Figure 25:
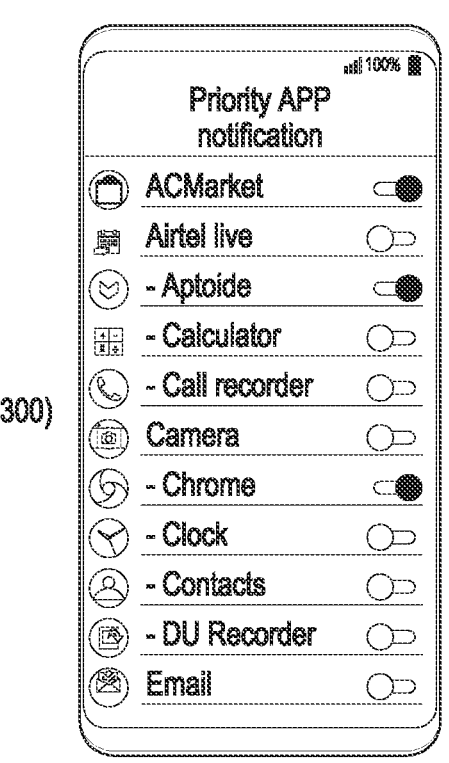

FIG. 25 is a schematic diagram illustrating the paging restriction applied or triggered by a user or by any of the module in the device according to various embodiments.

DETAILED DESCRIPTION

The embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Generally, in dual-SIM dual-standby (DSDS) devices, radio frequency (RF) resources will be utilized only on one SIM card/protocol stack at a time based on priority of a service (as determined by a RF Module) running between SIMs. For example, a call is given a higher priority than data, so the RF resources would be occupied by a calling SIM instead of a data SIM if call and data are running on the different SIM cards. However, the device needs to periodically monitor paging on other SIM (e.g., SIM2 (101)) for mobile terminating (MT) services when the RF is on SIM1 (100) or vice versa. When RF tune-away happens from one SIM to other SIM (e.g., from SIM1 (100) to SIM2 (101)), the service running on SIM1 (100) will be interrupted.

In a conventional system, whenever any critical fifth generation (5G) services/applications are running on a default or designated data service/subscription (DDS) SIM for any kind of data activity and RF is being used by the DDS SIM (e.g., SIM1 (100)), RF tune-away may be triggered to the other SIM (e.g., SIM2 (101)) to periodically monitor paging for mobile terminating (MT) services on SIM2 (101). Thus the critical 5G services/applications already running on the DDS SIM (SIM1 (100)) would be suspended/interrupted/halted with poor latency as the RF would be used/occupied intermittently by non-DDS SIM for paging monitoring and response.

Further, in conventional systems, when RF tune-away between SIMs occurs frequently, it also leads to high power consumption and usage of resources which may lead to device over-heating or higher battery consumption.

Further, when the paging received on the other SIM (e.g., SIM2 (101)) is for a voice call or other services needing the RF resources, it may lead to interruption of the applications/services being used and the applications/services might be paused/go to background. For example, if the paging on SIM2 (101) was for voice call, as soon as the call setup is finished on SIM2 (101), a call screen would come to foreground/displayed to the user and any existing applications (like gaming or office teams meeting or any VoIP based call etc) would either go to background or stop/pause completely for the duration of the call.

The conventional methods and systems leads to bad user experiences as the user might want to have a hassle-free and uninterrupted experience for the prioritized/critical applications, but due to paging on the other SIM card, these critical applications are paused/put to background.

In conventional methods and systems, a user may experience poor battery life and the device may take more time to cool off when heated up due to unnecessary paging monitoring on the other SIM card and unnecessary usage of RF and other device resources to connect to services on the other SIM card.

Unlike the conventional system, the systems and methods of the disclosure may avoid or reduce interruption of critical applications/services running on the DDS SIM due to mobile terminating (MT) voice calls (or SMS/MMS) on non-DDS SIM and may avoid or reduce unnecessary RF tune-away between the SIMs, which minimizes power consumption, avoids device overheating and avoids throughput/latency degradation.

Unlike the conventional system, the systems and methods of the disclosure may provide an uninterrupted and hassle-free experience to users while using critical applications/services and better power saving measures with better/more time for cooling when a device is heated up.

In conventional methods, a "paging restriction" feature for multi-USIM UE (300) operation may be provided, where the paging restriction feature is useful when the UE (300) expects not to be paged by the network for only voice/certain protocol data unit (PDU) service or for any purpose.

In conventional methods, a "Reject Paging Request" feature for multi-USIM UE (300) operation may be provided. The UE (300) uses "Reject Paging Request" feature to indicate to the network that the UE (300) expects not to be paged by the network. When the UE (300) receives paging, the UE (300) uses this feature to indicate to the network about paging restriction information if the UE (300) does not want to be paged by the network.

In the conventional methods, the "Paging Restriction" feature for multi-USIM UE (300) operation for long term evolution (LTE) may be used.

In conventional methods, there are scenarios in which high priority or low latency based critical applications (e.g., gaming banking applications/transactions etc) running on the DDS SIM (e.g., SIM1 (100)) are interrupted due to high latency incurred because of paging monitoring and subsequent MT services (voice calls or SMS/MMS) received on a non-DDS SIM (e.g., SIM2 (101)). The data throughput via any critical/data-heavy applications (e.g., any 4K based streaming, hotspot applications, etc.) running on DDS SIM is degraded/compromised due to unnecessary MT services on the other SIM.

Unlike the conventional system, the systems and methods of the disclosure may restrict MT services (voice calls or SMS/MMS) on a non-DDS SIM to avoid high latency or data throughput degradation while critical 5G data services are running on DDS SIM. The interruption of critical 5G data services due to high latency or low data throughput or MT call screens may result in a bad user experience.

In conventional systems, UE (300) has to tune-away the available RF receivers/transmitters/transceivers between both the SIM cards periodically to monitor the paging resources on one or both the SIM cards. This tune-away functionality consumes power/battery and may lead to low battery life or lead to more power consumption for the UE (300).

One or more scenarios in which the user has a dire/urgent need to save the battery/power of the device and does not want to waste power on unnecessary or low priority tasks include when a Power Saving mode/Ultra Power Saving mode is enabled, when device's battery is low. Additionally, there are scenarios such as when the device has heated up due to unnecessary calls/SMS/MMS or data activity, which leads to further utilization of the device's resources (such as battery/central processing unit (CPU) etc) and device does not get sufficient time to cool down before it may be used again.

In conventional systems, when the paging received on the other SIM2 (101) is for a voice call/other services needing RF resources, it may lead to interruption of the applications/services (meeting/call over VoIP, gaming screen etc) being used on SIM1 (100) and the applications/services might be paused/go to background. In this situation, currently there is no way to restrict the device from performing tune-away to read the paging and also there is no way to restrict the device from further utilizing the resources of the device for call/SMS/MMS/data activity based on a paging request, which may again lead to over-heating and increased battery/power consumption. This may lead to unnecessary tune-away and over-utilization of the resources of the device and result in high power consumption or over-eating, which is not intended by the user and provides the user with a poor experience while using 5G services.

The conventional method may use a paging restriction method in which each SIM is associated with a service and a priority of the service. Whenever a higher priority service is running on the SIM card for a duration more than a set threshold duration and transmitting data more than a data volume threshold value, the other SIM card requests to apply paging restrictions on the low priority services. The systems and methods of the disclosure need not assign any priority to the services and need not monitor duration of the services running, and instead may apply a paging restriction on the non-DDS SIM for all the services during certain critical scenarios such as low latency/critical services running (e.g., gaming, banking, etc.), applications not needing any interruptions running (e.g., meeting/call over VoIP, gaming screen, etc.), scenarios needing power saving or less consumption of resources (e.g., low battery state, device heating up/thermal mitigation, medium/ultra power saving enabled, etc.) running on the DDS-SIM.

In the conventional method, the UE (300) sends help information to the network when the dual SIM device is in a concurrent registration state to control data transmission/ reception using two or more SIMs overlaps or when a specific event occurs at an overlapping time and data service through one or more networks may be limited. The help information may include information for limiting or allowing the transmission of the paging message to the UE (300) for a predetermined period of time pre-set by the network. However, the systems and methods of the disclosure need not wait for an overlapping event to occur on both SIM(s) and rather may apply a paging restriction during certain critical scenarios such as low latency/critical services running (e.g., gaming, banking, etc.), applications not needing any interruptions running (e.g., meeting/call over VoIP, gaming screen, etc.), scenarios needing power saving or less consumption of resources (e.g., low battery state, device heating up/thermal mitigation, medium/ultra power saving enabled, etc.).

Figure 1:
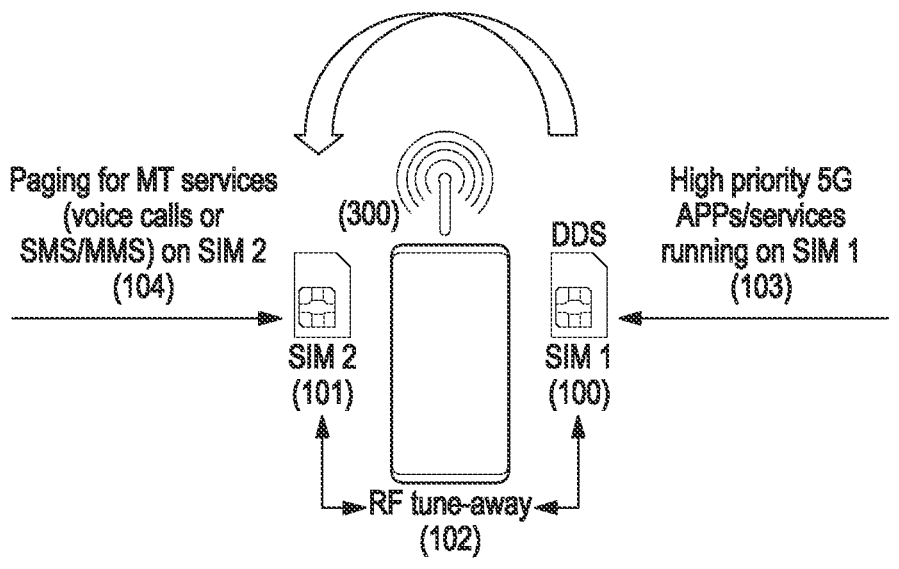
FIG. 1 is a schematic diagram illustrating conventional radio frequency (RF) tune away.

FIG. 1 is a schematic diagram illustrating radio frequency (RF) tune away according to conventional art.

In dual SIM devices, the UE (300) has to tune-away the available RF receivers/transmitters/transceivers between both the SIM cards (100, 101) periodically to monitor the paging resources on one or both of the SIM cards (100, 101). This tune-away (102) functionality impacts high priority/critical 5G applications/services (103) running on a DDS SIM with respect to high latency, or TPUT degradation or applications getting minimized/moved to background and leads to a bad user experience and also consumes more power/battery which may lead to high power consumption for the UE (300). The paging for MT services (104) includes voice calls or SMS/MMS on SIM2 (101).

In conventional systems, there is no method to restrict the device from performing tune-away to read the paging in such scenarios and also there is no way to restrict the device from utilizing further resources of the device for call/SMS/MMS/data activity based on a paging request which may again lead to over-heating and increased battery/power consumption.

Unlike the systems and methods of the disclosure, the conventional system has critical/low latency based applications interruption. the delay/latency sensitive critical applications (ex: a banking transaction or games) running on one SIM (e.g., DDS SIM-SIM1 (100)) are interrupted/affected/work with poor latency as the RF is frequently tuned away to monitor paging for MT services (voice calls or SMS/MMS) received on the other SIM (e.g., non-DDS-SIM2 (101)). High latency affects critical application services.

Unlike the systems and methods of the disclosure, in the conventional system, an application is minimized/paused/goes to background due to a call screen in the foreground.

Critical applications (such as an office meeting application or a banking transaction or a VoIP app-based call or gaming services) running on the device are minimized/paused/go to background due to paging for an MT voice call and call getting connected. An MT call screen pops up in the foreground and any critical application running will go to background/pause for the duration of the voice call.

Unlike the systems and methods of the disclosure, the conventional system has high power/resource consumption and increased cool off time during device heating. The high power/resource consumption is due to continuous RF tune-away between the SIMs. Users are affected during low battery and when any power saving mode (medium/ultra) is enabled. Moreover, during device overheating, unnecessary calls/SMS/MMS or data activity leads to further utilization of the device's resources (such as battery/CPU, etc.) and device does not get sufficient time to cool down.

Unlike the systems and methods of the disclosure, the conventional system suffers from data throughput degradation. When the mobile is using any critical/data-heavy applications (e.g., any 4K-based streaming, hotspot applications, etc.), running on one SIM (e.g., DDS SIM-SIM1 (100)) is degraded/compromised/suspended (on both primary as well as client devices for hotspot) due to unnecessary MT services (voice calls or SMS/MMS) on the other SIM (SIM2 (101)).

Figure 2:
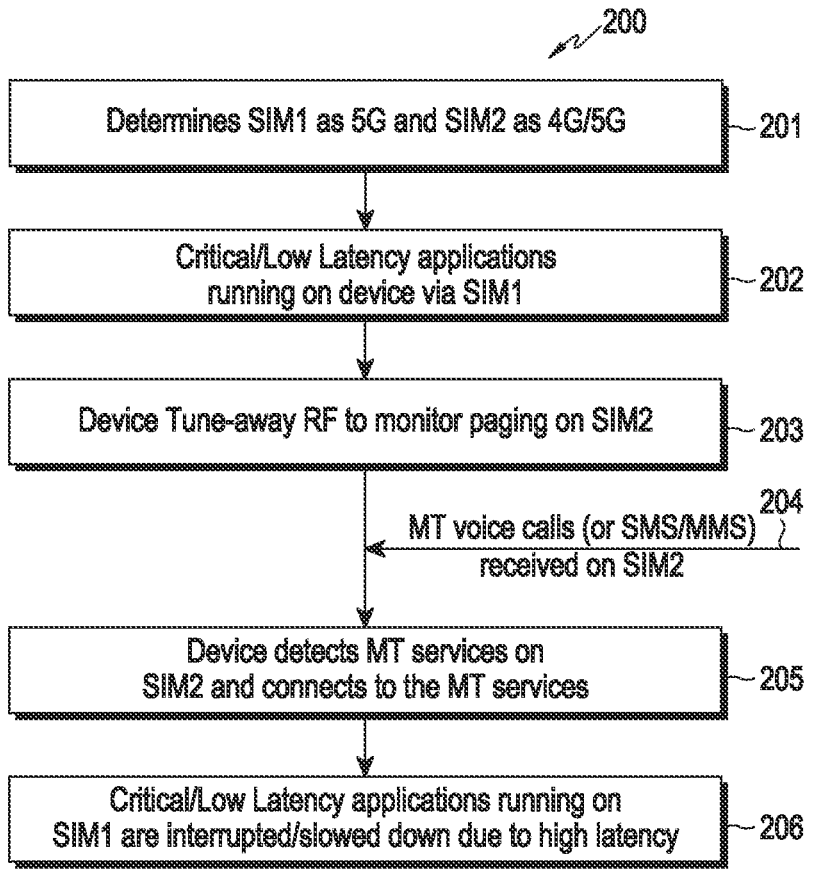
FIG. 2 is a flow chart illustrating a problem of critical or low latency applications interruption according to the conventional art.

FIG. 2 is a flow chart (200) illustrating a problem of critical or low latency applications interruption, according to conventional art.

At (201), the UE (300) determines SIM1 (100) as 5G and SIM2 (101) as fourth generation (4G)/5G.

At (202), the UE (300) determines critical/low latency applications running on device via the SIM1 (100).

At (203), the device tunes-away RF to monitor paging on the SIM2 (101).

At (204), MT voice calls (or SMS/MMS) are received on SIM2 (101).

At (205), the device detects MT services on SIM2 (101) and connects to the MT services.

At (206), the critical/low latency applications running on SIM1 (100) are interrupted/slowed down due to high latency.

The pre-conditions in a dual SIM Device are mobile data being set to SIM1 (100) and critical applications running on device via SIM1 (100).

In the conventional implementation, the device has to tune-away the available RF receivers/transmitters/transceivers between both SIM cards periodically to monitor the paging resources on the other SIM card (SIM2 (101)). While monitoring paging on a non-DDS SIM (SIM2 (101)), the device may detect a mobile terminating (MT) service such as voice calls/SMS/MMS on SIM2 (101) and connect on SIM2 (101) to receive the MT service. Critical applications (e.g., banking, gaming, etc.) running on the DDS SIM are interrupted/slowed down/disconnected due to high latency incurred because of MT services received on the non-DDS SIM. In the conventional system, there is no way to restrict the device from performing tune-away to read the paging on other SIMs in such situations.

Figure 3A:
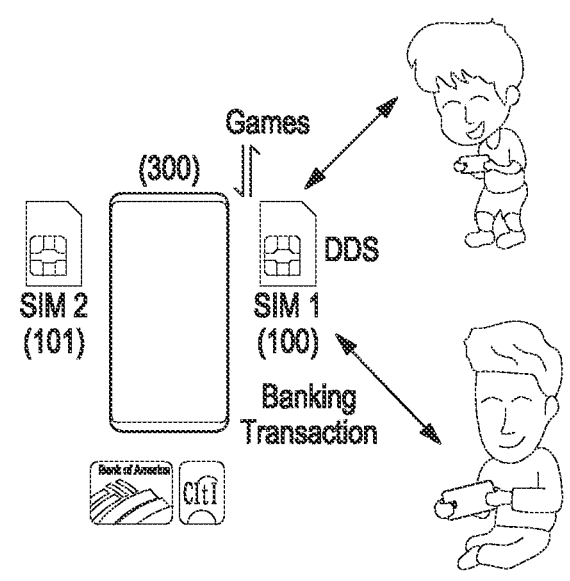
FIGS. 3A, 3B, and 3C are examples illustrating a critical or low latency applications interruption according to the conventional art.
Figure 3B:
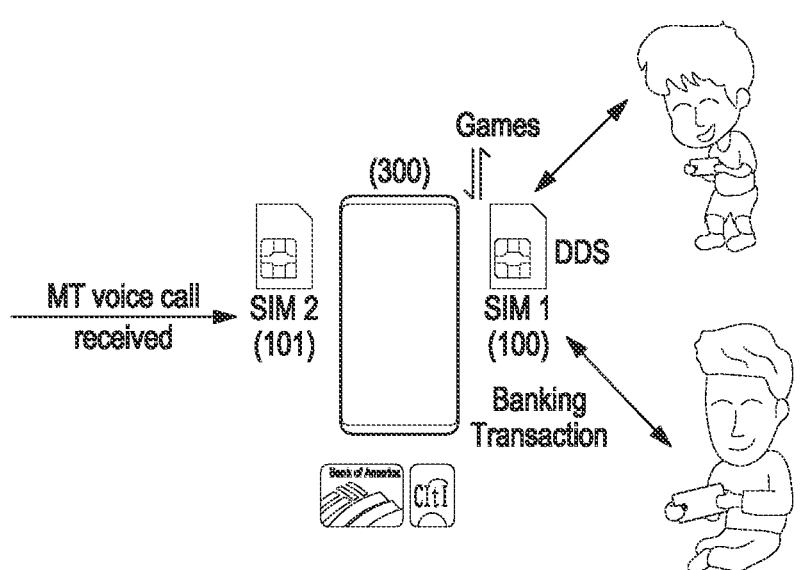
Figure 3C:
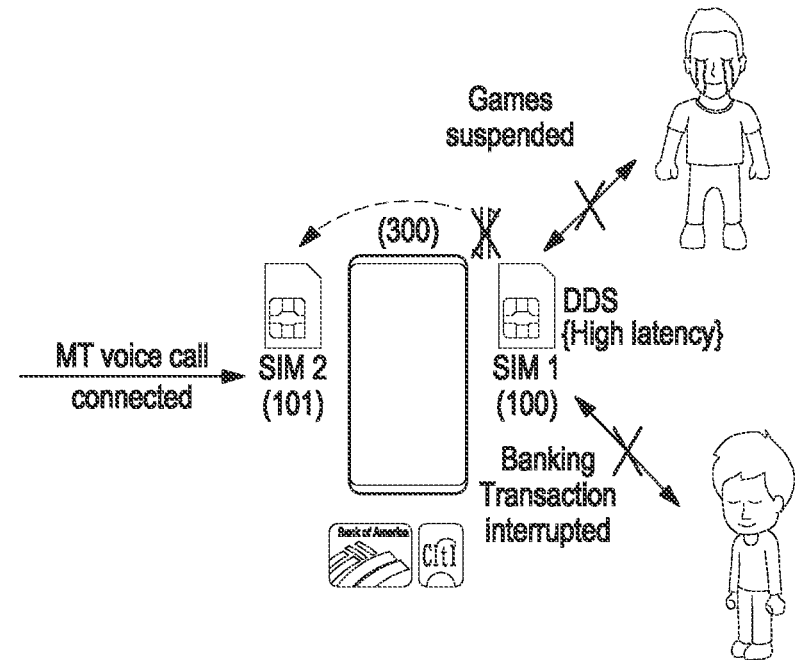

FIGS. 3A, 3B, and 3C are examples illustrating a critical or low latency applications interruption, according to conventional art.

FIG. 3A discloses critical/low-latency based applications such as banking transaction or gaming services and the like running on a DDS SIM (e.g., SIM1 (100)).

FIG. 3B discloses the device monitoring paging on SIM2 (101) and receiving an MT voice call on a non-DDS SIM while the critical/low-latency applications such as banking transaction or gaming services are running on the DDS SIM (e.g., SIM1 (100))

FIG. 3C discloses the critical/low-latency applications (e.g., banking transaction or gaming services) running on the DDS SIM (e.g., SIM1 (100)) being suspended/interrupted due to high latency incurred because of the MT voice call received on the non-DDS SIM (e.g., SIM2 (101)). The RF tune-away tunes to the non-DDS SIM (e.g., SIM2 (101)) to monitor MT services on SIM2 (101). Critical services on the DDS SIM (e.g., SIM1 (100)) are interrupted as the RF tune-away to SIM2 (101) is triggered.

Figure 4:
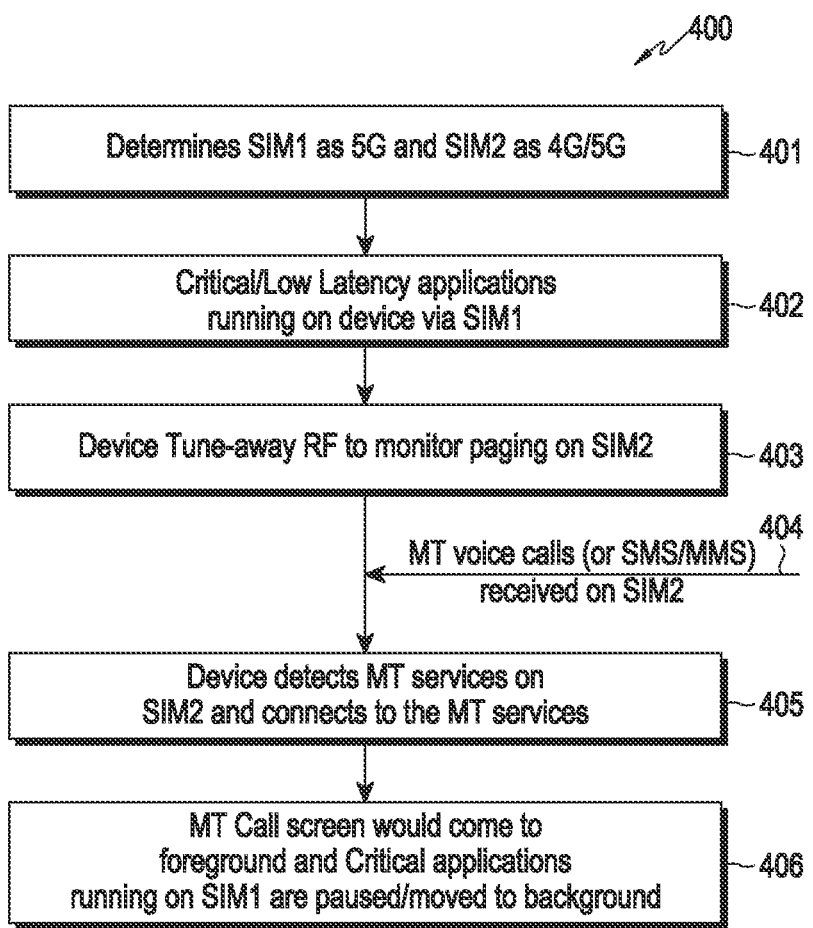
FIG. 4 is a flow chart illustrating a problem occurring when critical applications running on SIM1 are paused or moved to background according to the conventional art.

FIG. 4 is a flow chart (400) illustrating a problem of critical applications running on SIM1 (100) being paused or moved to background, according to conventional art.

At (401), the UE (300) determines SIM1 (100) as 5G and SIM2 (101) as 4G/5G.

At (402), the UE (300) determines critical/low-latency applications to be running on the device via SIM1 (100).

At (403), the device tunes-away RF to monitor paging on SIM2 (101).

At (404), MT voice calls (or SMS/MMS) are received on SIM2 (101).

At (405), the device detects MT services on SIM2 (101) and connects to the MT services.

At (406), the MT services call screen comes to the foreground and critical applications running on SIM1 (100) are paused/moved to the background.

The pre-conditions in dual SIM device are that mobile data is set to SIM1 (100) and critical applications are running on the device via SIM1 (100).

In the conventional implementation, the device has to tune-away the available RF receivers/transmitters/transceivers between both SIM cards periodically to monitor the paging resources on the other SIM card (SIM2 (101)).

While monitoring paging on the non-DDS SIM (SIM2 (101)), the device may detect a mobile terminating (MT) service such as voice calls/SMS/MMS on SIM2 (101) and connect on SIM2 (101) to receive the MT service.

Critical applications (such as an office meeting application or a VoIP app-based call or gaming services) running on the device (SIM1 (100)) are minimized/paused/go to background due to the paging for the MT voice call (SIM2 (101)) and the call getting connected. An MT call screen pops up in the foreground and any critical applications running go to background/pause for the duration of the voice call.

In the conventional system, there is no way to restrict the device from performing tune-away to read the paging on other SIMs in such situations.

Figure 5A:
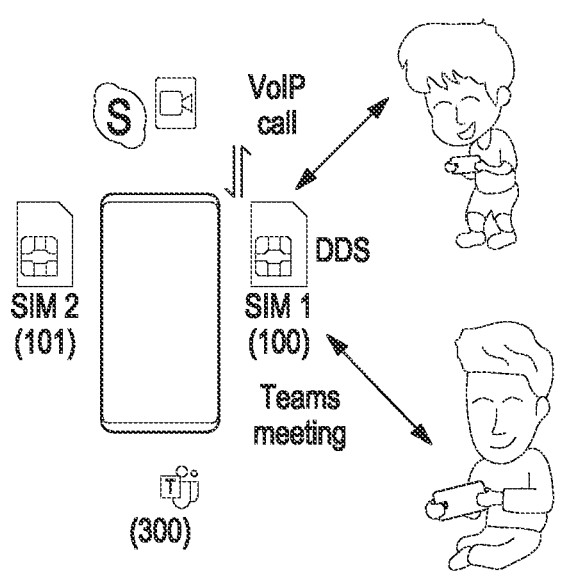
FIGS. 5A, 5B, and 5C are examples illustrating a scenario when the critical applications running on SIM1 are paused or moved to background according to the conventional art.
Figure 5B:
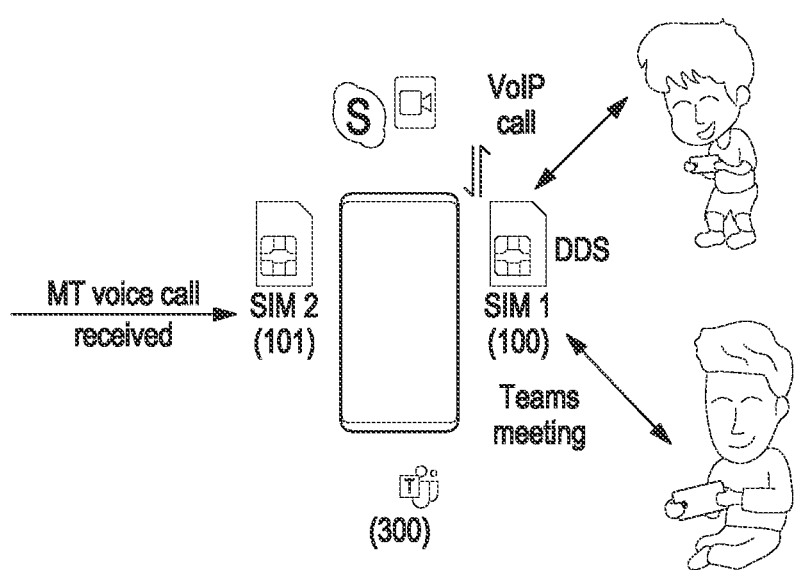
Figure 5C:
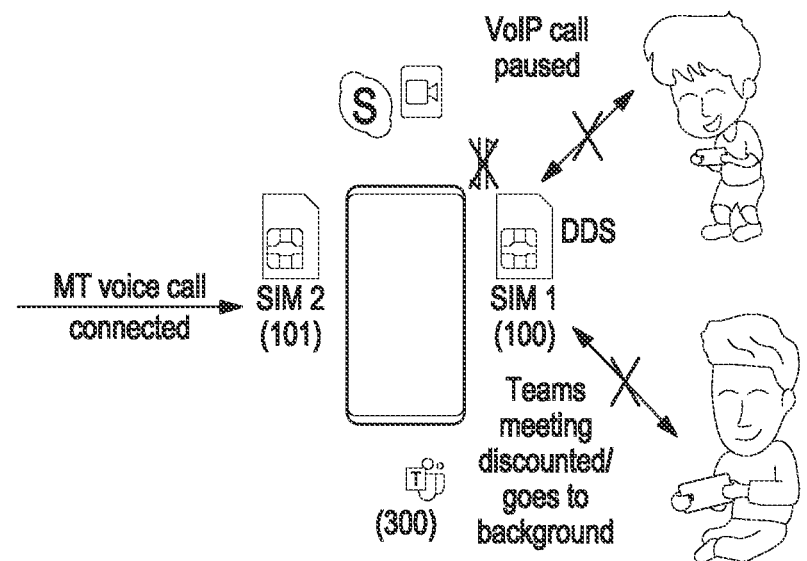

FIGS. 5A, 5B, and 5C are an example illustrating a scenario in which critical applications running on SIM1 (100) are paused or moved to the background according to conventional art.

Referring to FIG. 5A, critical applications such as teams meeting or VoIP based call or gaming applications are running on DDS SIM (e.g., SIM1 (100)).

Referring to FIG. 5B, the device monitors paging on SIM2 (101) and an MT voice is call received on the non-DDS SIM while critical applications such as teams/office meeting or VoIP based call or gaming services are running on the DDS SIM (e.g., SIM1 (100)).

Referring to FIG. 5C, critical applications (such as an office meeting application or a VoIP app-based call or gaming services) running on the device (SIM1 (100)) are minimized/paused/go to the background due to the paging for the MT voice call (SIM2 (101)) and the call getting connected. An MT call screen pops up in the foreground and any critical applications running go to background/pause for the duration of the voice call. The RF tune-away to the non-DDS SIM (e.g., SIM2 (101)) happens when the MT call is received on SIM2 (101). Critical services on DDS SIM (e.g., SIM1 (100)) are interrupted as the tune-away to SIM2 (101) is triggered.

Figure 6A:
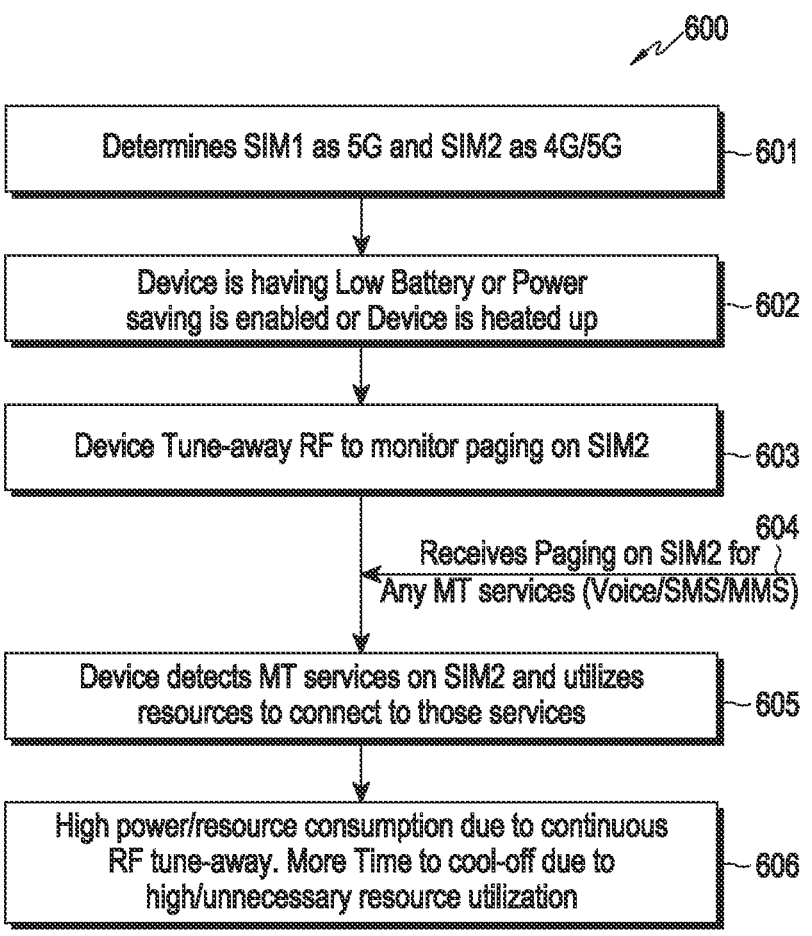
FIG. 6A is a flow chart illustrating a problem of high power or resource consumption and increased cool off time during device heating according to the conventional art.

FIG. 6A is a flow chart (600) illustrating a problem of high power or resource consumption and increased cool-off time during device heating according to conventional art.

At (601), the UE (300) determines SIM1 (100) as 5G and SIM2 (101) as 4G/5G.

At (602), the UE (300) determines device has low battery or power saving is enabled or the device is heated up.

At (603), the device RF tunes-away to monitor paging on the SIM2 (101).

At (604), MT voice calls (or SMS/MMS) are received on SIM2 (101).

At (605), the device detects MT services on SIM2 (101) and utilizes resources to connect to these services.

At (606), the device detects high power/resource consumption due to continuous RF tune-away, which causes increased cool-off timedue to high/unnecessary resource utilization.

In the conventional art, the pre-conditions in the dual SIM device are mobile data being set to SIM1 (100) and low battery being detected or power saving (any such as medium or ultra-power saving) or the device is heated up.

The conventional implementation tunes-away the available RF receivers/transmitters/transceivers between both SIM cards periodically to monitor the paging resources on the other SIM card (SIM2 (101)). While monitoring paging on the non-DDS SIM (SIM2 (101)), the device may detect a mobile terminating (MT) service such as voice calls/SMS/MMS on SIM2 (101) and connect on SIM2 (101) to receive the MT service.

The tune-away functionality consumes power/battery and may lead to low battery life or lead to more power consumption for the UE (300), even in a power saving mode, or the device might turn off due to no (or low) battery. There may be some scenarios in which the device has heated up and the user wants to avoid unnecessary calls/SMS/MMS or data activity to avoid any further utilization of the resources of the device (e.g., battery/CPU, etc.) and to provide the device sufficient time to cool down before it can be used again.

The conventional implementation does not restrict the device from performing tune-away to avoid reading the paging and also there is no way to restrict the device from utilizing further resources of the device for call/SMS/MMS/data activity based on a paging request which may again lead to over-heating and more battery/power consumption.

Figure 6B:
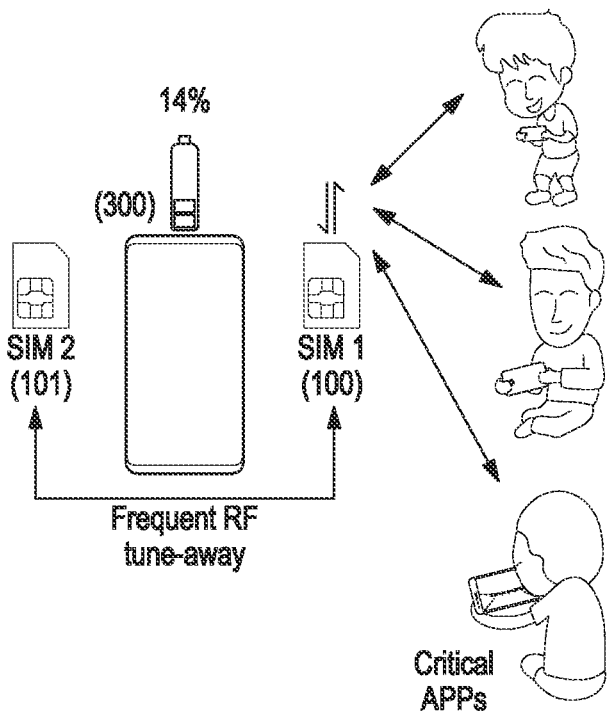
FIGS. 6B, 6C, and 6D are examples illustrating the problem of high power or resource consumption and increased cool off time during device heating according to the conventional art.
Figure 6C:
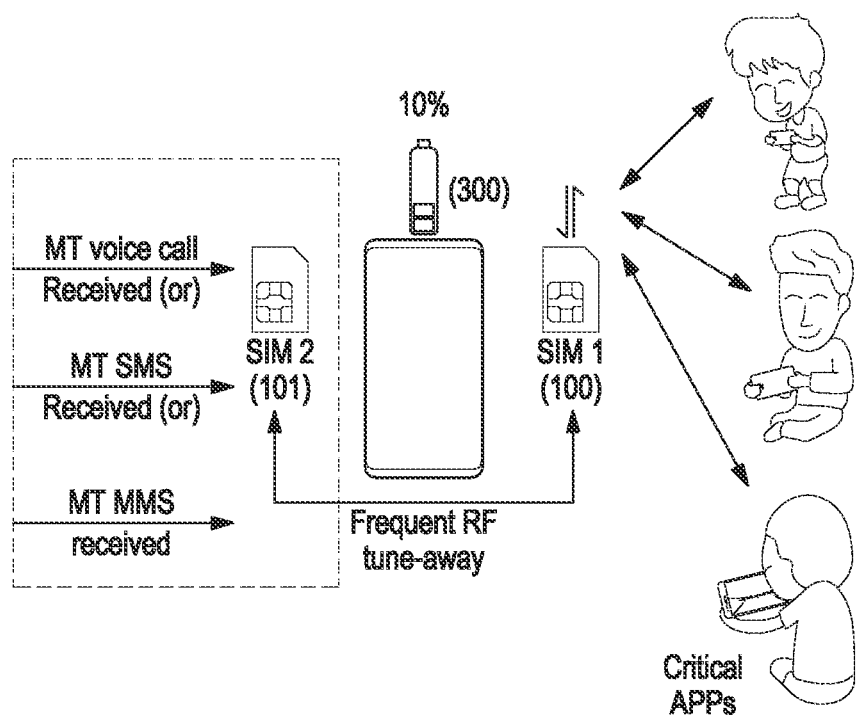
Figure 6D:
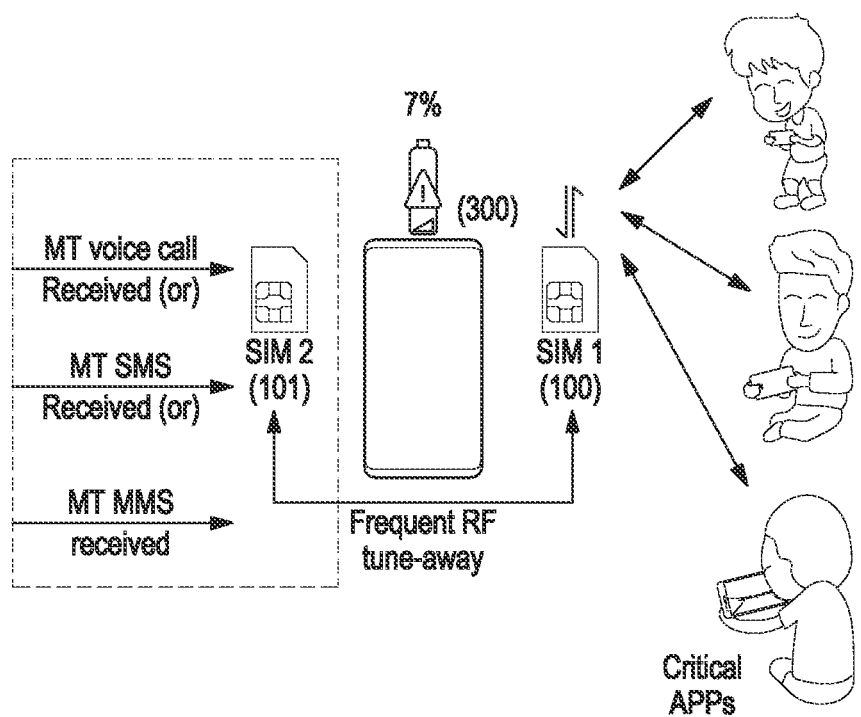

FIGS. 6B, 6C, and 6D are examples illustrating the problem of high power or resource consumption and increased cool-off time during device heating according to conventional art.

Referring to FIG. 6B, the UE (300) determines that the device is has low battery or power saving is enabled or the device is heated up and some critical applications are already running.

Referring to FIG. 6C, the device frequently monitors paging on the SIM2 (101) and MT service (call/SMS/MMS, etc.) may be received on the non-DDS SIM while the device is in low battery/power saving mode/over-heating state and some critical applications are already running on the DDS SIM (e.g., SIM1 (100)). The RF tune-away tunes-away to the non-DDS SIM due to MT services on the non-DDS SIM.

Referring to FIG. 6D, frequent RF tune-aways happen between the SIM1 (100) and the SIM2 (101) due to continuous MT services monitoring and the MT services received (voice calls or SMS or MMS) on the SIM2 (101), which may lead to low battery life or lead to more power consumption for the UE (300), even in a power saving mode, or the device might turn of due to no (or low) battery. The device uses more resources due to MT services on SIM2 (101), leading to more heating and increased cool-off time for the device to use normal services.

Figure 7:
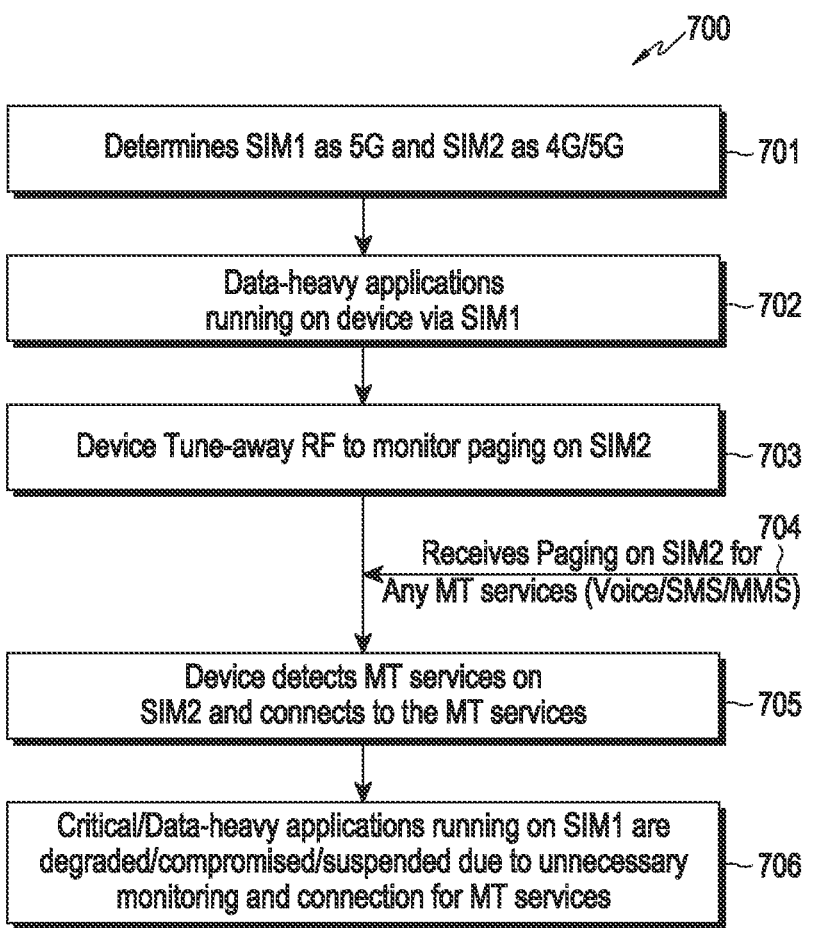
FIG. 7 is a flow chart illustrating a problem of data throughput degradation according to the conventional art.

FIG. 7 is a flow chart illustrating a problem of data throughput degradation according to conventional art.

At (701), the UE (300) determines SIM1 (100) as 5G and SIM2 (101) as 4G/5G.

At (702), the UE (300) determines data-heavy applications to be running on device via SIM1 (100)

At (703), the device RF tunes-away to monitor paging on SIM2 (101).

At (704), MT voice calls (or SMS/MMS) are received on SIM2 (101).

At (705), the device detects the MT services on SIM2 (101) and connects to the services.

At (706), critical/data-heavy applications running on SIM1 (100) are degraded/compromised/suspended due to unnecessary monitoring and connection for MT services.

According to the conventional art, the pre-conditions in a dual SIM device are the mobile data being set to SIM1 (100) and data-heavy applications (e.g., 4K streaming or mobile hotspot) being used via SIM1 (100).

In the conventional implementation, the device has to tune-away the available RF receivers/transceivers between both SIM cards periodically to monitor the paging resources on the other SIM card (SIM2 (101)).

While monitoring paging on the non-DDS SIM (SIM2 (101)), the device may detect a mobile terminating (MT) service such as voice calls/SMS/MMS on SIM2 (101) and connect on SIM2 (101) to receive the MT service. Any critical/data-heavy applications (e.g., 4K based streaming, hotspot applications, etc.) running on the device (SIM1 (100)) are degraded/compromised/suspended (on both primary as well as client devices for hotspot) due to unnecessary MT services (voice calls or SMS/MMS) on the other SIM (SIM2 (101)).

In the conventional system, there is no way to avoid interruptions to critical/data-heavy applications running on the DDS SIM (Ex: SIM1 (100)) on host and connected client devices due to MT services (voice calls or SMS/MMS) received on the non-DDS SIM (e.g., SIM2 (101)), which leads to 5G data throughput degradation.

Figure 8A:
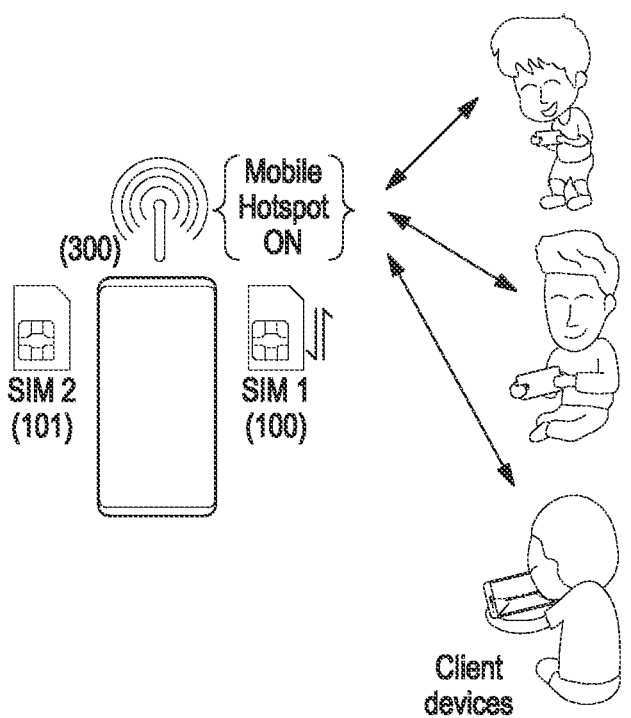
FIGS. 8A, 8B, and 8C are examples illustrating a problem of data throughput degradation according to the conventional art.
Figure 8B:
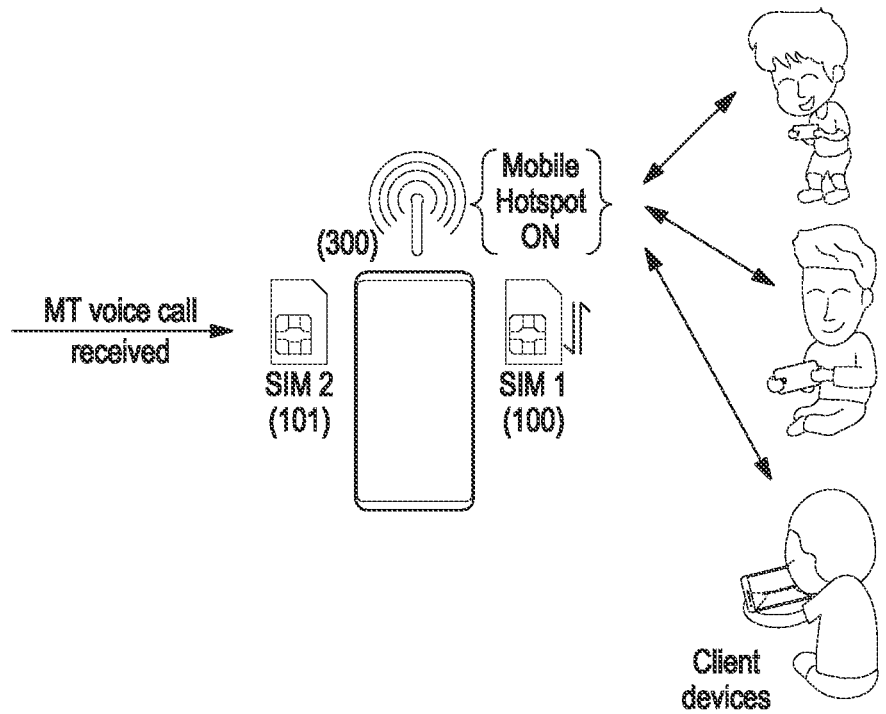
Figure 8C:
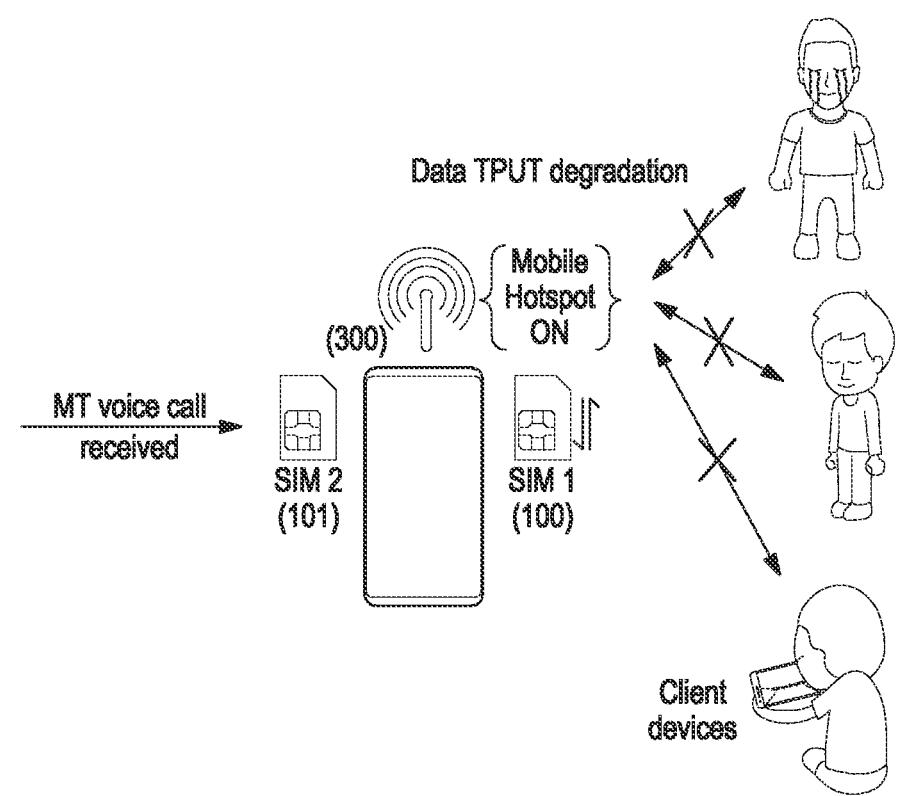

FIGS. 8A, 8B, and 8C are examples illustrating the problem of data throughput degradation according to conventional art.

Referring to FIG. 8A data-heavy applications such as 4K streaming or mobile hotspot running on a DDS SIM (e.g., SIM1 (100)). Many client devices are connected to primary mobile hotspot device and critical applications are running on the client devices.

Referring to FIG. 8B, the device frequently monitors paging on the SIM2 (101) and an MT service such as an MT voice call is received on the non-DDS SIM while data-heavy applications such as 4K streaming or hotspot applications are running on the primary/client devices which are connected to the mobile hotspot active on the DDS SIM (e.g., SIM1 (100)).

Referring to FIG. 8C, frequent RF tune-aways happen between SIM1 (100) and SIM2 (101) due to continuous MT services monitoring and MT services received (voice calls or SMS or MMS) on SIM2 (101) and may lead to data throughput degradation/interruption on data-heavy applications and may lead to interruption of mobile hotspot services (on the host and connected client devices) running on the DDS SIM.

Figure 9:
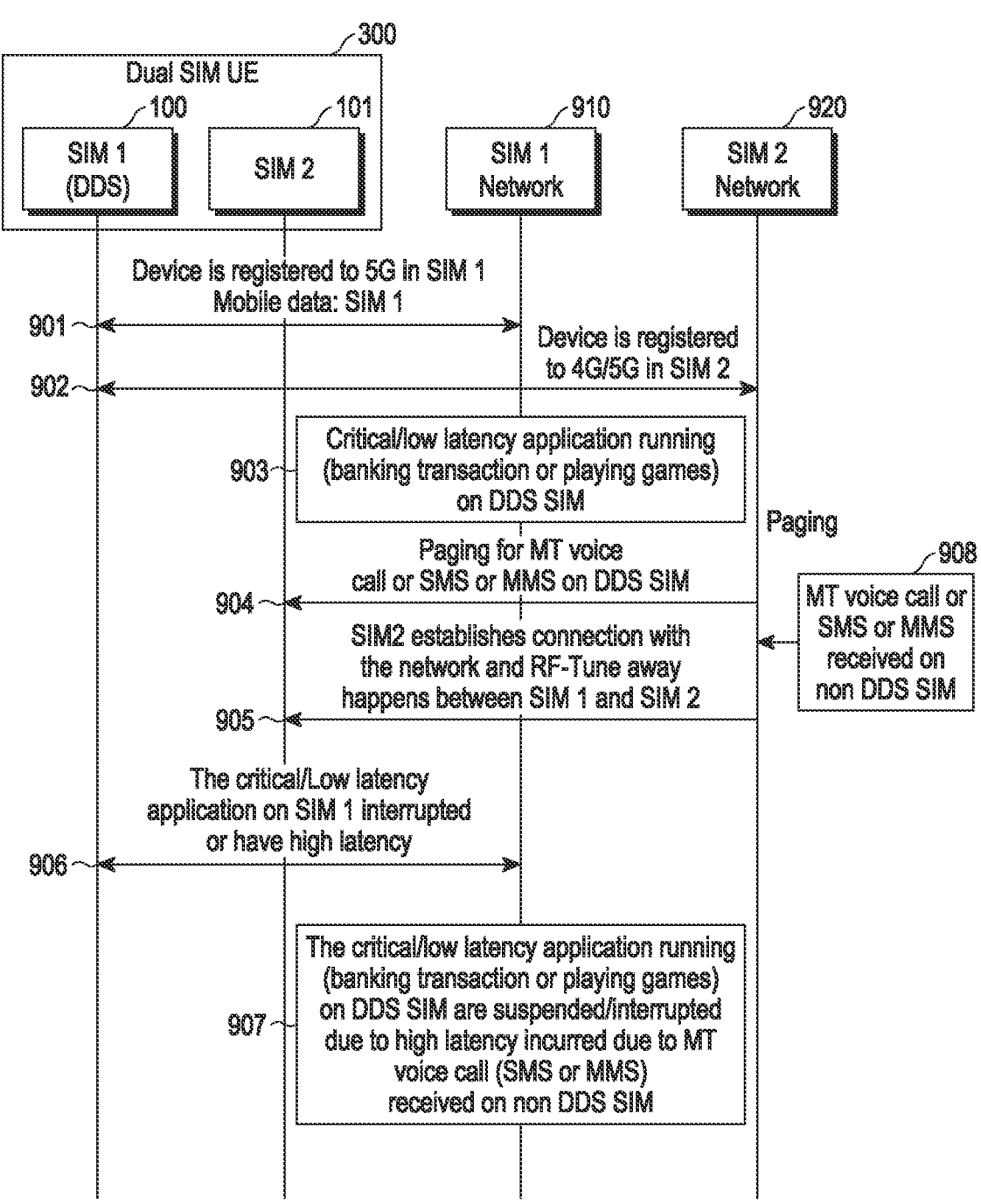
FIG. 9 is a sequence diagram illustrating a problem of critical or low latency applications interruption according to the conventional art.

FIG. 9 is a sequence diagram illustrating a problem of critical or low latency applications interruption according to conventional art.

At 901, the device is registered to 5G in SIM1 (100) and the mobile data is active in SIM1 (100).

At (902), the device is registered to 4G/5G in SIM2 (101).

At (903), critical/low latency applications (e.g., banking transaction or playing games) are running on the DDS SIM.

At (904), paging occurs for an MT voice call or SMS or MMS on the non-DDS SIM.

At (905), the SIM2 (101) establishes a connection with the network and RF tune-away happens between SIM1 (100) and SIM2 (101).

At (906), the critical/low-latency application on the SIM1 (100) is interrupted or has high latency.

At (907), the critical/low-latency application (e.g., banking transaction or playing games) running on the DDS SIM is suspended/interrupted due to high latency incurred due to the MT voice call (SMS or MMS) received on the non-DDS SIM.

At (908), the MT voice call or SMS or MMS is received on the non-DDS SIM.

Figure 10:
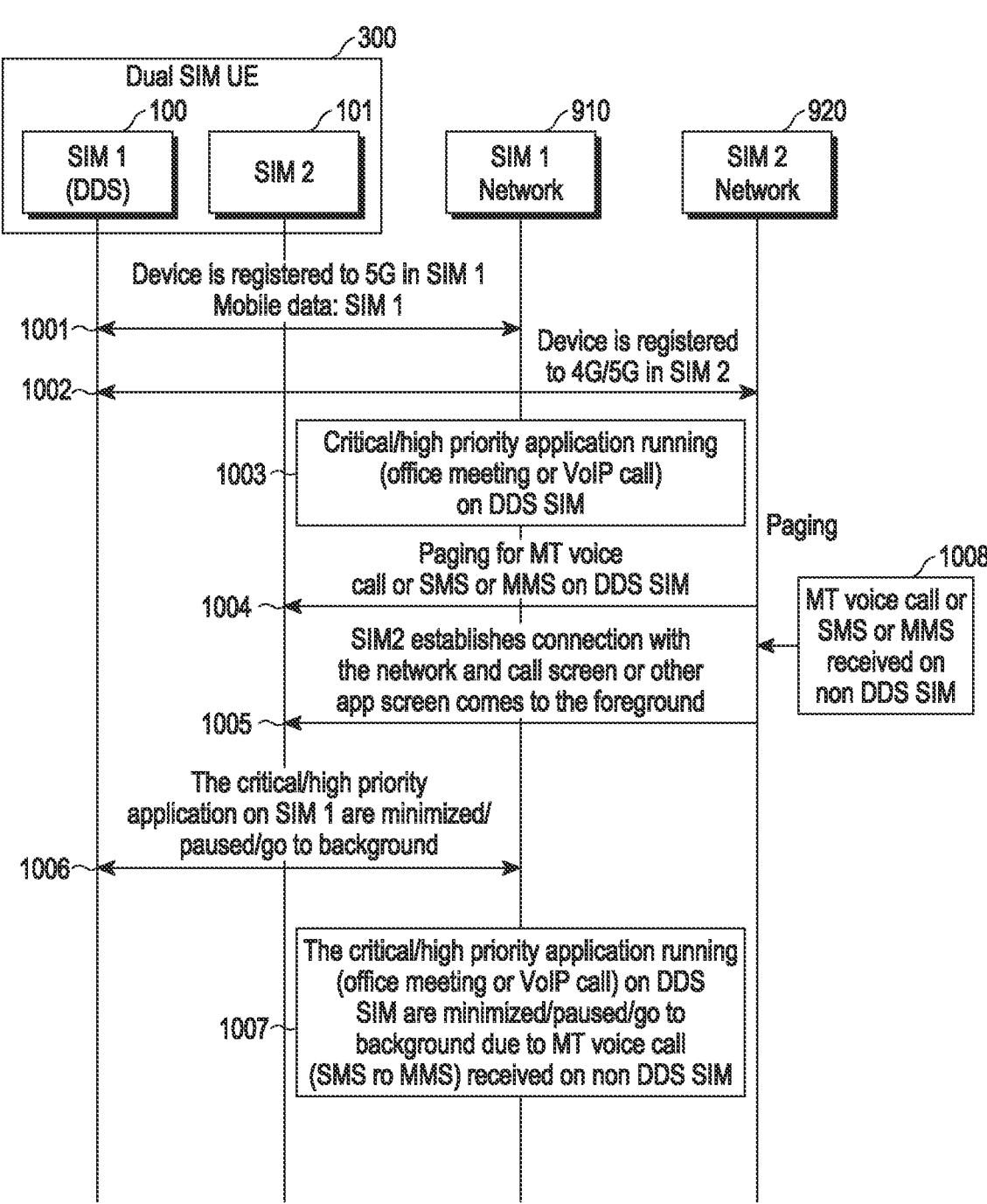
FIG. 10 is a sequence diagram illustrating a problem occurring when critical applications running on SIM1 are paused or moved to background according to the conventional art.

FIG. 10 is a sequence diagram illustrating a problem of critical applications running on SIM1 (100) being paused or moved to background according to conventional art.

At 1001, device is registered to 5G in SIM1 (100) and the mobile data is active in SIM1 (100).

At (1002), the device is registered to 4G/5G in SIM2 (101).

At (1003), critical/high priority applications (e.g., office meeting or VoIP call) are running on the DDS SIM.

At (1004), paging occurs for an MT voice call or SMS or MMS on the non-DDS SIM.

At (1005), the SIM2 (101) establishes a connection with the network and a call screen or other app screen comes to the foreground.

At (1006), the critical/high priority application on the SIM1 (100) are minimized/paused/go to background.

At (1007), the critical/high priority application (e.g., office meeting or VoIP call) running on DDS SIM are minimized/paused/go to background due to the MT voice call (SMS or MMS) received on the non-DDS SIM.

At (1008), the MT voice call or SMS or MMS is received on the non-DDS SIM.

Figure 11:
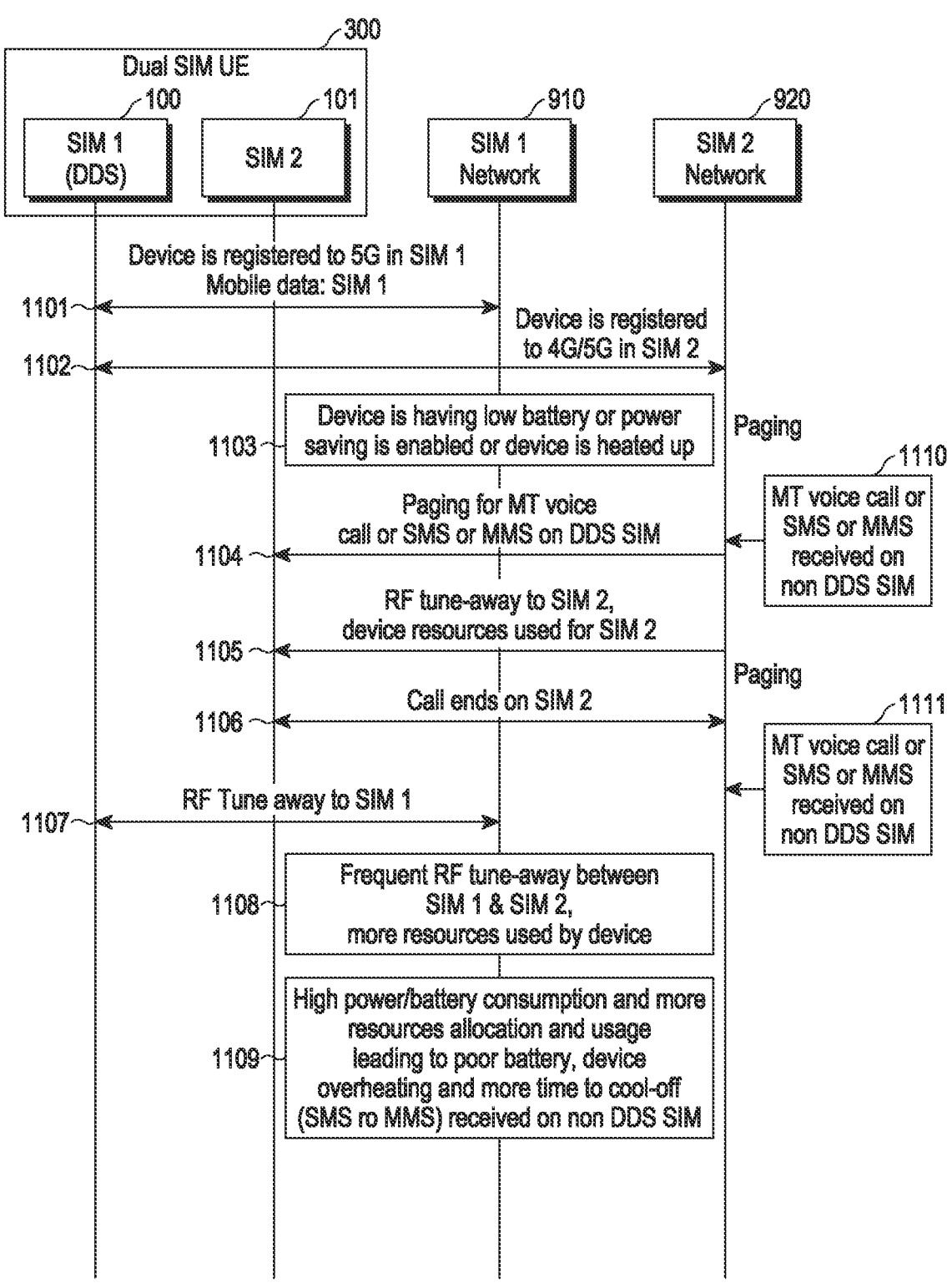
FIG. 11 is a sequence diagram illustrating a problem of high power or resource consumption and increased cool off time during device heating according to the conventional art.

FIG. 11 is a sequence diagram illustrating a problem of high power or resource consumption and increased cool off time during device heating according to conventional art.

At (1101), the device is registered to 5G in SIM1 (100) and the mobile data is active in SIM1 (100).

At (1102), the device is registered to 4G/5G in SIM2 (101).

At (1103), device is in a low battery state or power saving is enabled or the device is heated up.

At (1104), paging occurs for an MT voice call or SMS or MMS on the non-DDS SIM.

At (1105), an RF tune-away to SIM2 (101) occurs, and device resources are used for SIM2 (101).

At (1106), the call ends on SIM2 (101).

At (1107), the device RF tunes-away to SIM1 (100).

At (1108), the device frequently RF tunes-away between SIM1 (100) & SIM2 (101), and more resources are used by the device.

At (1109), the high power/battery consumption and greater resources allocation and usage leads to poor battery, device over-heating and increased cool-off time (1109)

At (1110) and at (1111), the MT voice call voice call or SMS or MMS is received on the non-DDS SIM (1110)

Figure 12:
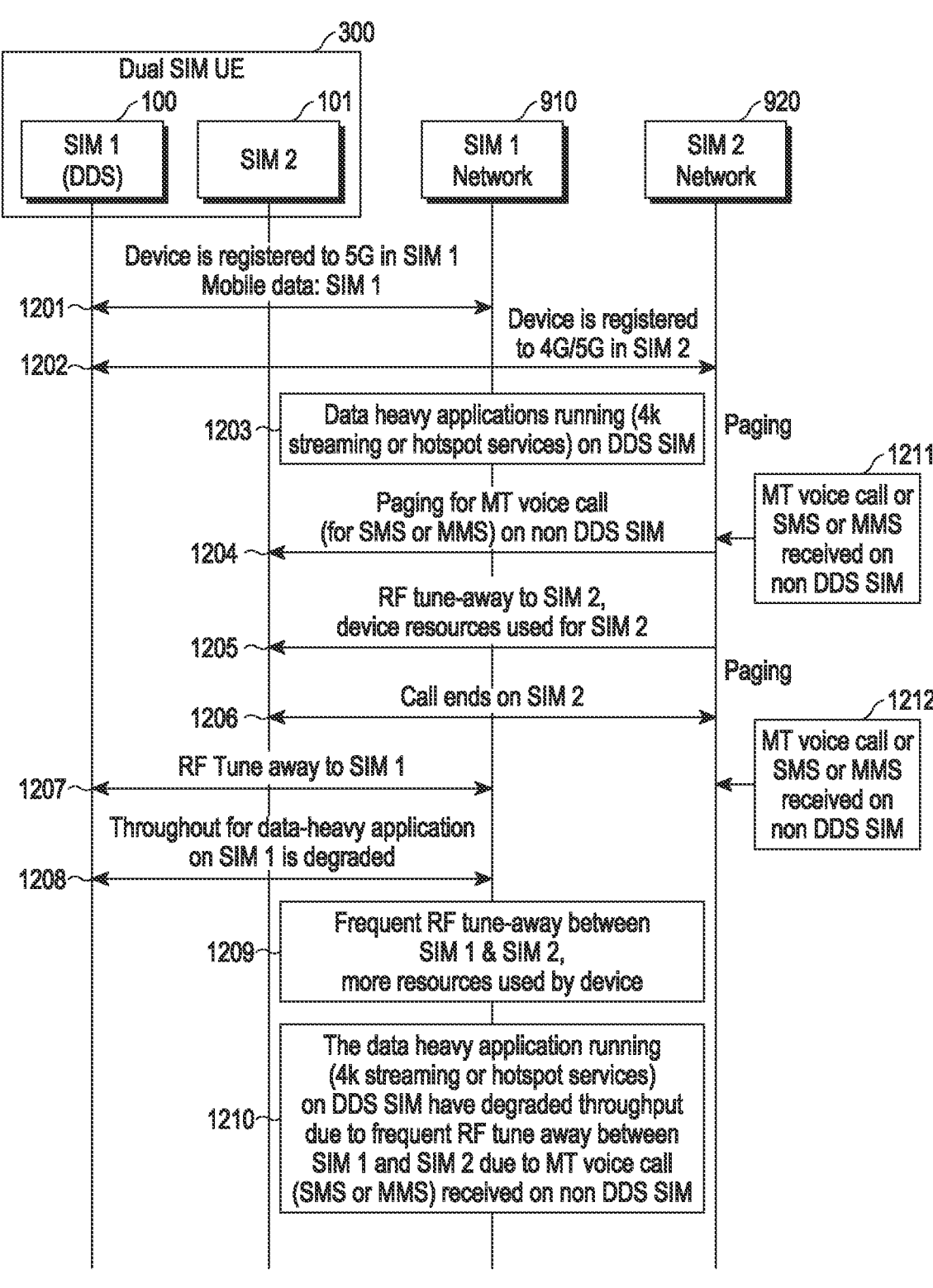
FIG. 12 is a sequence diagram illustrating a problem of data throughput degradation according to the conventional art.

FIG. 12 is a sequence diagram illustrating a problem of data throughput degradation according to conventional art.

At (1201), the device is registered to 5G in the SIM1 (100) and the mobile data is active in the SIM1 (100).

At (1202), the device is registered to 4G/5G in SIM2 (101).

At (1203), the device runs data-heavy applications (e.g., 4 k streaming or hotspot services) on the DDS SIM.

At (1204), the UE (300) determines that paging for an MT voice call or SMS or MMS on the non-DDS SIM occurs.

At (1205), the UE (300) RF tunes-away to SIM2 (101), and device resources are used for SIM2 (101).

At (1206), the UE (300) determines that the call ends on SIM2 (101).

At (1207), the device RF tunes-away to SIM1 (100).

At (1208), throughout for data-heavy application on SIM1 (100) is degraded.

At (1209), the device frequently RF tunes-away between SIM1 (100) & SIM2 (101), and more resources are used by device.

At (1210), the data-heavy application running (e.g., 4 k streaming or hotspot services) on the DDS SIM have degraded throughput due to frequent RF tuning-away between the SIM1 (100) and SIM2 (101) due to an MT voice call (SMS or MMS) received on the non-DDS SIM.

At (1211) and at (1212), the MT voice call or SMS or MMS is received on the non-DDS SIM (1120)

Figure 13:
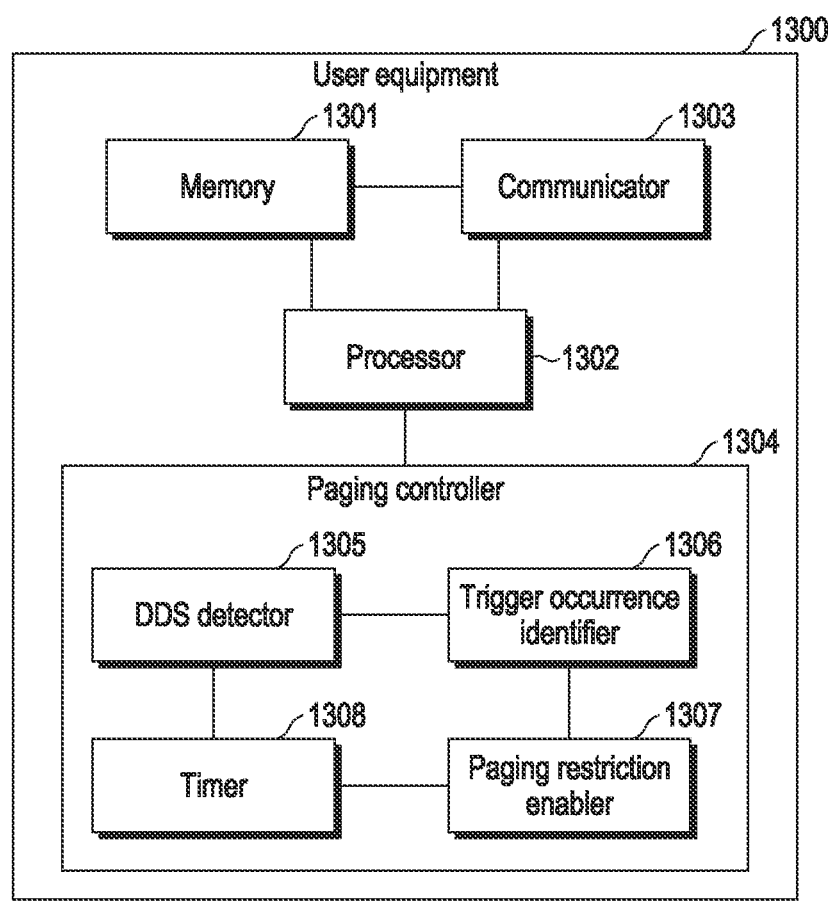
FIG. 13 is a block diagram of an example UE for managing paging restrictions according to various embodiments.

FIG. 13 is a block diagram of a UE (1300) for managing paging restrictions according to various embodiments.

Referring to FIG. 13, examples of the UE (1300) include, but are not limited to, a laptop computer, a palmtop computer, a desktop computer, a mobile phone, a smartphone, Personal Digital Assistant (PDA), a tablet computer, a wearable device, an internet of things (IoT) device, a virtual reality device, a foldable device, a flexible device, an immersive system, and the like.

In an embodiment, the UE (1300) includes a memory (1301), a processor (1302), a communicator (1303) and a paging controller (1304).

The memory (1301) stores instructions to be executed by the processor (1302) for managing paging restrictions. The memory (1301) may include non-volatile storage elements. Examples of such non-volatile storage elements may, for example, include magnetic hard discs, optical discs, floppy discs, flash memories, or forms of electrically programmable memories (EPROM) or electrically erasable and programmable (EEPROM) memories. In addition, the memory (1301) may, in various examples, be considered a non-transitory storage medium. The term "non-transitory" may indicate that the storage medium is not embodied in a carrier wave or a propagated signal. However, the term "non-transitory" should not be interpreted as meaning that the memory (1301) is non-movable. In various examples, the memory (1301) may be configured to store larger amounts of information than its storage space. In certain examples, a non-transitory storage medium may store data that may, over time, change (e.g., in random access memory (RAM) or cache). The memory (1301) may be an internal storage unit or it may be an external storage unit of the electronic device, a cloud storage, or any other type of external storage.

The processor (1302) (including, e.g., processing circuitry) is configured to execute instructions stored in the memory (1301). The processor (1302) may be a general-purpose processor, such as a central processing unit (CPU), an application processor (AP), or the like, a graphics-only processing unit such as a graphics processing unit (GPU), a visual processing unit (VPU) and the like. The processor (1302) may include multiple cores to execute the instructions.

The communicator (1303) (including, e.g., communication circuitry) is configured for communicating internally between hardware components in other user equipment or a server. Further, the communicator (1303) is configured to facilitate the communication between the UE (1300) and other devices via one or more networks (e.g. radio technology). The communicator (1303) may include, for example, an electronic circuit specific to a standard that enables wired or wireless communication.

The paging controller (1304) may, for example, be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The paging controller (1304) includes a DDS detector (1305), a trigger occurrence identifier (1306), a paging restriction enabler (1307) and a timer (1308).

The DDS detector (1305) detects whether a first SIM is configured for a dedicated data subscription (DDS). The trigger occurrence identifier (1306) detects an occurrence of a predetermined trigger condition in connection with at least one of the first SIM and at least one second SIM. The paging restriction enabler (1307) enables a paging restriction to the at least one second SIM based on the occurrence of the predetermined trigger condition. The timer (1308) initiates a timer in parallel to enabling the paging restriction to the at least one second SIM for a particular time period. Further, the paging restriction enabler (1307) disables the paging restriction on the at least one second SIM when the predetermined trigger condition does not persist after the expiry of the timer.

In an embodiment, the paging controller (1304) is configured to initiate a timer in parallel to enabling the paging restriction to the at least one second SIM for a particular time period. The paging controller (1304) is further configured to disable the paging restriction on the at least one second SIM when the predetermined trigger condition does not persist after the expiry of the timer.

In an embodiment, the predetermined trigger condition includes, for example, when critical data services or application is running on the first SIM and when paging is not restricted for mobile terminal (MT) services on the at least one second SIM.

In an embodiment, the critical data services or application may include, for example, at least one of office meeting applications, banking transaction, banking transaction applications, gaming services, hotspot applications, hotspot services, 4 k streaming applications, VoIP application-based calls, low-latency based application, data-oriented application, and the like.

In an embodiment, the MT services may include, for example, voice calls, SMS, MMS, IMS and others.

In an embodiment, the paging controller (1304) is configured to determine whether paging on the at least one second SIM of the UE (1300) is restricted. The paging controller (1304) is further configured to determine whether the timer for restricting paging on the at least one second SIM is expired when paging on the at least one second SIM of the UE (1300) is restricted. The paging controller (1304) is further configured to detect the critical data services or application running in the UE (1300) on the first SIM and the paging is not restricted on the at least one second SIM of the UE (1300); and initiating the timer for restricting paging on the at least one second SIM.

In an embodiment, the paging controller (1304) is configured to determine whether the UE (1300) and a network support a paging restriction feature. The paging controller (1304) is further configured to determine whether the critical data services or application is running in the UE (1300) and the paging on the at least one second SIM of the UE (1300) is not restricted, when the UE (1300) and a network support a paging restriction feature. The paging controller (1304) is further configured to disable paging restrictions when the UE (1300) and the network do not support the paging restriction feature.

In an embodiment, the paging controller (1304) is configured to determine whether the critical data services or application is paused or minimized. The paging controller (1304) is further configured to initiate a timer for restricting paging on the at least one second SIM when the critical application is not paused or not minimized. The paging controller (1304) is further configured to determine whether the timer for restricting paging on the at least one second SIM is expired and the critical application is paused or minimized. The paging controller (1304) is further configured to remove paging restrictions from the at least one second SIM when the timer for restricting paging on the at least one second SIM is expired and the critical application is paused or minimized. The paging controller (1304) is further configured to enable the paging restriction on the at least one second SIM when the timer for restricting paging on the at least one second SIM is not expired or the critical application is not paused or not minimized.

In an embodiment, the paging controller (1304) is configured to receive a selection of at least one application from a user in the user interface of the UE (1300); wherein the UE (1300) considers the selected at least one application as critical data services or application. The paging controller (1304) is further configured to determine whether the selected at least one application is open. The paging controller (1304) is further configured to initiate restriction of paging on the at least one second SIM when the selected at least one application is open. The paging controller (1304) is further configured to disable paging restrictions on the at least one second SIM when the selected at least one application is not open.

In an embodiment, the paging controller (1304) is configured to determine at least one data-heavy application running on the UE, low latency applications running on the UE (1300) through the first SIM, high priority applications running on the UE (1300) through the first SIM, the UE (1300) having a low battery, the UE (1300) with power saving enabled, and/or the UE (1300) being over heated. The paging controller (1304) is further configured to determine the paging restriction is not enabled and detect whether the predetermined trigger condition is met. The paging controller (1304) is further configured to enable the paging restriction to the at least one second SIM when the predetermined trigger condition is met.

In an embodiment, the paging restriction provides at least one of low latency, high data throughput and avoidance of frequent RF tuning-away between the multiple SIMs.

In an embodiment, the UE (1300) indicates paging restriction information to the network through the at least one second SIM in the form of a service request or a registration request message to stop receiving the MT services in the second SIM.

In an embodiment, the paging controller (1304) is configured to identify the critical data services or application running on the UE (1300) based on an artificial intelligence (AI)-based engine. The paging controller (1304) is further configured to determine whether the UE (1300) is connected to a Wi-Fi network. The paging controller (1304) is further configured to enable the paging restriction to at least one of the first SIM and the at least one second SIM when the UE (1300) is connected to the Wi-Fi network, wherein the UE (1300) includes at least one of the first SIM and the at least one second SIM.

Figure 14:
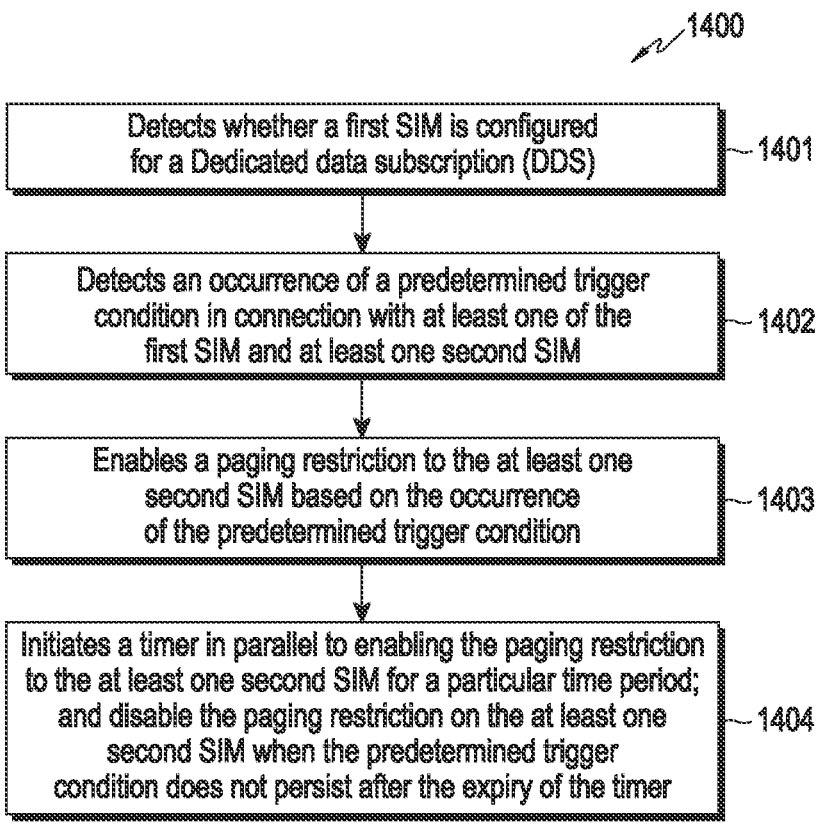
FIG. 14 is a flow chart illustrating an example method for managing paging restrictions according to various embodiments.

FIG. 14 is a flow chart (1400) illustrating an example method for managing paging restrictions according to various embodiments.

At operation (1401), the UE (1300) detects whether the first SIM is configured for the DDS.

At operation (1402), the UE (1300) detects the occurrence of a predetermined trigger condition in connection with at least one of the first SIM and the at least one second SIM.

At operation (1403), the UE (1300) enables the paging restriction to the at least one second SIM based on the occurrence of the predetermined trigger condition.

At operation (1404), the UE (1300) initiates a timer in parallel to enabling the paging restriction to the at least one second SIM for a particular time period and the UE (1300) disables the paging restriction on the at least one second SIM when the predetermined trigger condition does not persist after expiry of the timer.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosure.

Figure 15:
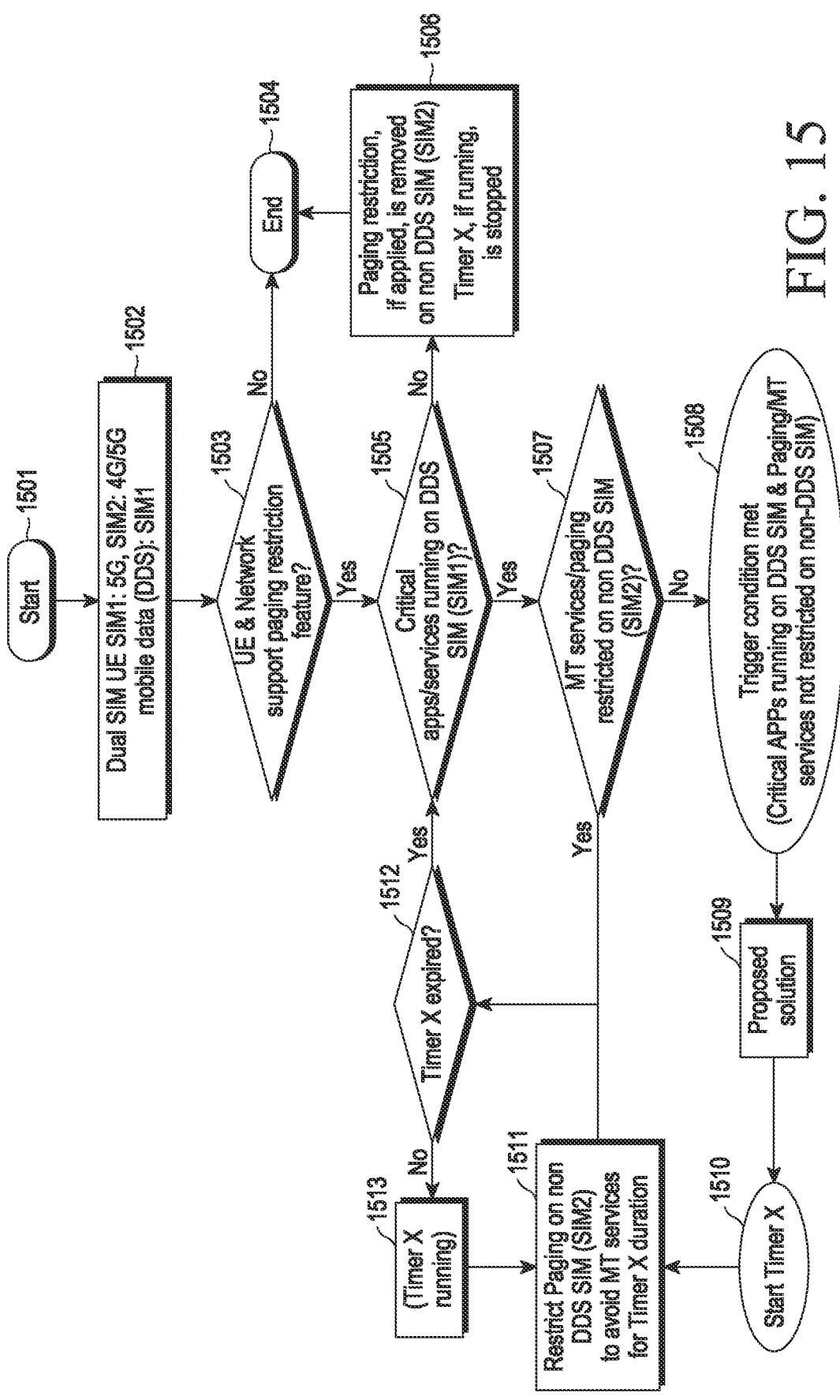
FIG. 15 is a flow chart illustrating an example process of paging restrictions according to various embodiments.

FIG. 15 is a flow chart illustrating an example process of paging restrictions according to various embodiments.

At operation 1501, the UE (1300) initiates the process of managing the paging restrictions.

At operation 1502, the Dual SIM UE (1300) determines that a SIM1 (100) is 5G and a SIM2 (101) is 4G/5G. Further the mobile data (DDS) is connected through SIM1 (100).

At operation 1503, the UE determines whether the UE (1300) and the network support a paging restriction feature.

At operation 1504, the process ends if the UE (1300) and the network do not support the paging restriction feature.

At operation 1505, the UE (1300) determines whether critical applications/services are running on the DDS SIM (SIM1 (100)).

Based on determining that critical applications/services are not running on the DDS SIM, at operation 1506, the paging restriction, if applied, is removed on the non-DDS SIM (SIM2 (101)) and the timer X, if running, is stopped.

Based on determining that critical applications/services are running on the DDS SIM, at operation 1507, the UE (1300) determines whether the MT services or paging is restricted on the non-DDS SIM (SIM2 (101)).

Based on determining that the MT services or paging is not restricted on the non-DDS SIM, at operation 1508, the UE (1300) determines whether a trigger condition met (e.g., critical applications running on the DDS SIM and paging/MT services not restricted on the non-DDS SIM).

At operation 1509 and at operation 1510, the UE (1300) initiates the timer X.

At operation 1511, when the timer starts, the UE (1300) restricts paging on the non-DDS SIM (SIM2 (101)) to avoid MT services for the duration of the timer X.

At operation 1512, the UE (1300) determines whether the timer X has expired. If the timer has not expired, at operation 1513, the timer X is running and the restriction is maintained.

If the timer has expired, at operation 1505, the UE (1300) determines whether critical applications/services are running on the DDS SIM (SIM1 (100)).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 16:
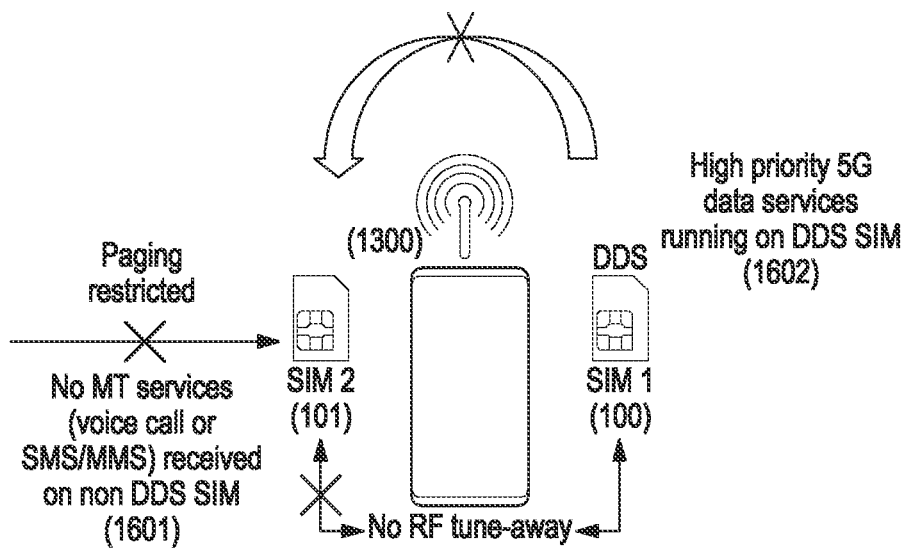
FIG. 16 is a schematic diagram illustrating radio frequency (RF) tune away according to various embodiments.

FIG. 16 is a schematic diagram illustrating radio frequency (RF) tune away according to various embodiments.

When high priority 5G data services are running on the DDS SIM (1602), in the system of the disclosure, no MT services (voice call or SMS/MMS) are received on the non-DDS SIM (1601).

In the method of the disclosure, the UE (1300) indicates "Paging Restriction Information" in a service request or registration request message indicating to the SIM2 (101) network that "all paging is restricted" to avoid MT voice calls or MT SMS/MMS on SIM2 (101) while the user is using high priority/critical 5G data services on SIM1 (100), or vice versa. In an embodiment, UE (1300) may set up a connection with the SIM2 network to respond to a page with a reject paging indication to the network to indicate that the UE (1300) does not accept the paging and may include paging restriction information indicating "all paging is restricted".

With the system and method of the disclosure, a user may enjoy un-interrupted high priority/critical 5G data services and the user experience is enhanced as 5G data services running on SIM1 (100) are not interrupted, due to the paging restriction imposed on SIM2 (101) for avoiding MT voice calls or MT SMS/MMS in SIM2 (101).

With the systems and methods of the disclosure, the UE (1300) restricts paging to avoid RF Tune-Away between SIMs, which may reduce power consumption, avoid or reduce overheating, avoid or reduce throughput degradation, and avoid or reduce critical applications being minimized/moved to background.

The systems and methods of the disclosure may provide a seamless user experience on multi-SIM devices in scenarios in which critical applications running on a DDS SIM are suspended/interrupted due to MT services (voice calls or SMS or MMS) received on a non-DDS SIM.

Whenever any critical/low-latency based application, data-heavy or data-oriented application is running (e.g., office meeting applications, banking transaction or applications, gaming services, hotspot applications or services, 4K streaming applications, VoIP app-based calls, etc.) or a device is in a critical condition such as low battery/power saving enabled, device over-heating, etc., with the systems and method of the disclosure, the device indicates/applies a paging restriction on one or more SIM(s) (e.g., the non-DDS SIM) and avoids performing periodic tune-away to read the paging on all the non-significant SIM cards. This prevents or reduces the network from paging the device for any mobile terminating (MT) services (voice/SMS/MMS/data, etc) on the SIM(s) on which the paging restrictions is applied and any interruptions to the already running applications on the device are avoided or reduced.

The systems and methods of the disclosure may provide a user a better experience in one or more of at least the following ways: latency or throughput is not affected and device gets low latency and better throughput for the already running applications; running applications are not interrupted/minimized/do not go to background and stay in the foreground; the device utilizes fewer resources and less power and provides better battery performance; and the device does not heat up quickly (due to less resource utilization) and gets more time to cool-off during overheating.

The systems and methods of the disclosure may include the following operations:

At operation 1: Detection of paging restriction support: Detection of the "Paging Restriction" feature support in the UE (1300) and the network. Ensuring that the UE (1300) and network support the "Paging Restriction" feature.

At operation 2: Identifying trigger condition: The device identifies whether a trigger condition is met or not. The trigger condition may, for example, be one or more of the following: any critical/low-latency based application/data-heavy or data-oriented application is running or any application/service which does not need to be paused/minimized/moved to background is running (e.g., office meeting applications, banking transaction or applications, gaming services, hotspot applications or services, 4K streaming applications, VoIP app-based calls, etc.), device is in critical condition such as low battery/power saving mode enabled/device over-heating.

At operation 3: Restriction of paging for MT services: If the device identifies that the trigger condition is met and a pre-defined internal timer-X is not running or the paging is not restricted yet, the device indicates paging restriction information to the network (to the network of the non-DDS SIM if mobile data is enabled/used or to the network of both/all the SIM(s) if Wi-Fi is enabled/used) through any of the below messages over 3GPP Access: service request (SR) messages, extended service request (ESR) messages, tracking area update (TAU) request signaling, attach request signaling, registration request signaling or by sending a service request message/paging response to the paging network including the reject paging indication as the response to paging indicating that the UE (1300) does not accept paging.

The paging restriction information may, for example, indicate any of the following: all paging is restricted; or all paging is restricted, except paging for voice service (IMS voice); or all paging is restricted, except for certain PDU session(s) (e.g., emergency services); or all paging is restricted, except paging for voice service (IMS voice) and certain PDU session(s).

The device may control paging restriction using any pre-defined internal timer X. The timer X is started when paging is restricted as indicated by the device. On expiration of the timer-X, the trigger condition is checked again and paging restriction is applied if the trigger condition is met again.

Operation 4: Removal of paging restriction for MT services: on expiration of the timer X, the device checks the trigger condition again: If the trigger condition is not met, the paging restriction is removed. The device sends an indication to the network without providing/including any paging restriction information in the any of messages over 3GPP access (messages as defined in operation-3). If the trigger condition is met again, the device continues indicating paging restriction to the network as per the operation-3 procedure.

In a case of events such as switch-off/switch-on, reboot of the device, SIM removal/re-insert, airplane mode on/off, timer X shall be stopped and any paging restriction applied to the device shall be removed.

Figure 17:
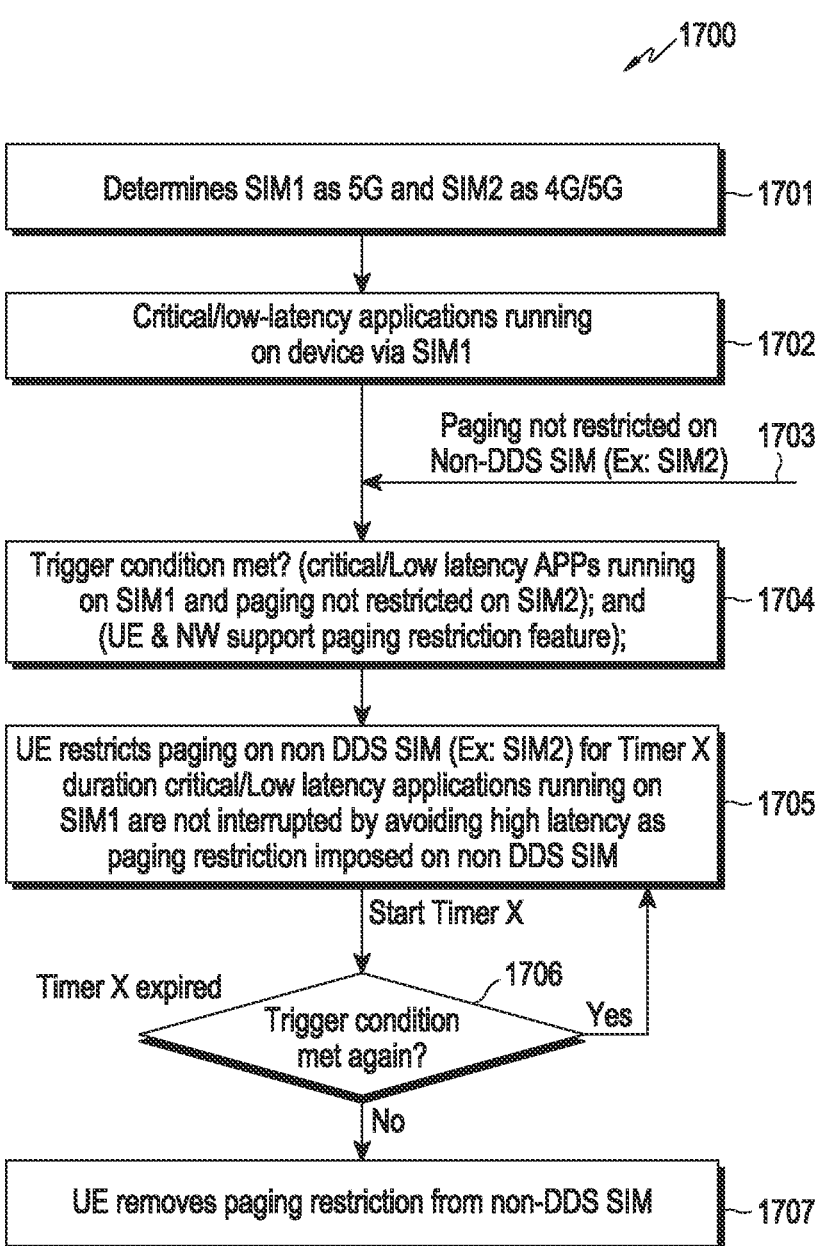
FIG. 17 is a flow chart illustrating a solution for critical or low latency applications interruption according to various embodiments.

FIG. 17 is a flow chart 1700 illustrating a solution for critical or low latency applications interruption according to various embodiments.

At (1701), the UE (1300) determines SIM1 (100) as 5G and SIM2 (101) as 4G/5G.

At (1702), critical/low-latency applications are running on UE (1300) via SIM1 (100).

At (1703), paging is not restricted on SIM2 (101).

At (1704), the UE (1300) determines whether a trigger condition is met (e.g., critical/low-latency applications running on SIM1 (100) and paging not restricted on SIM2 (101)); and whether UE (1300) and the network support the paging restriction feature.

Based on the trigger condition being met, at (1705), UE (1300) restricts paging on the non-DDS SIM (e.g., SIM2 (101)) for timer X duration so that critical/low-latency applications running on SIM1 (100) are not interrupted and high latency is avoided as the paging restriction is imposed on the non-DDS SIM.

The timer is started and, at (1706), the UE (1300) determines whether the trigger condition is again met when the timer expires. If so, the operation returns to (1705).

If not, at (1707), the UE (1300) removes the paging restriction from the non-DDS SIM.

Figure 18:
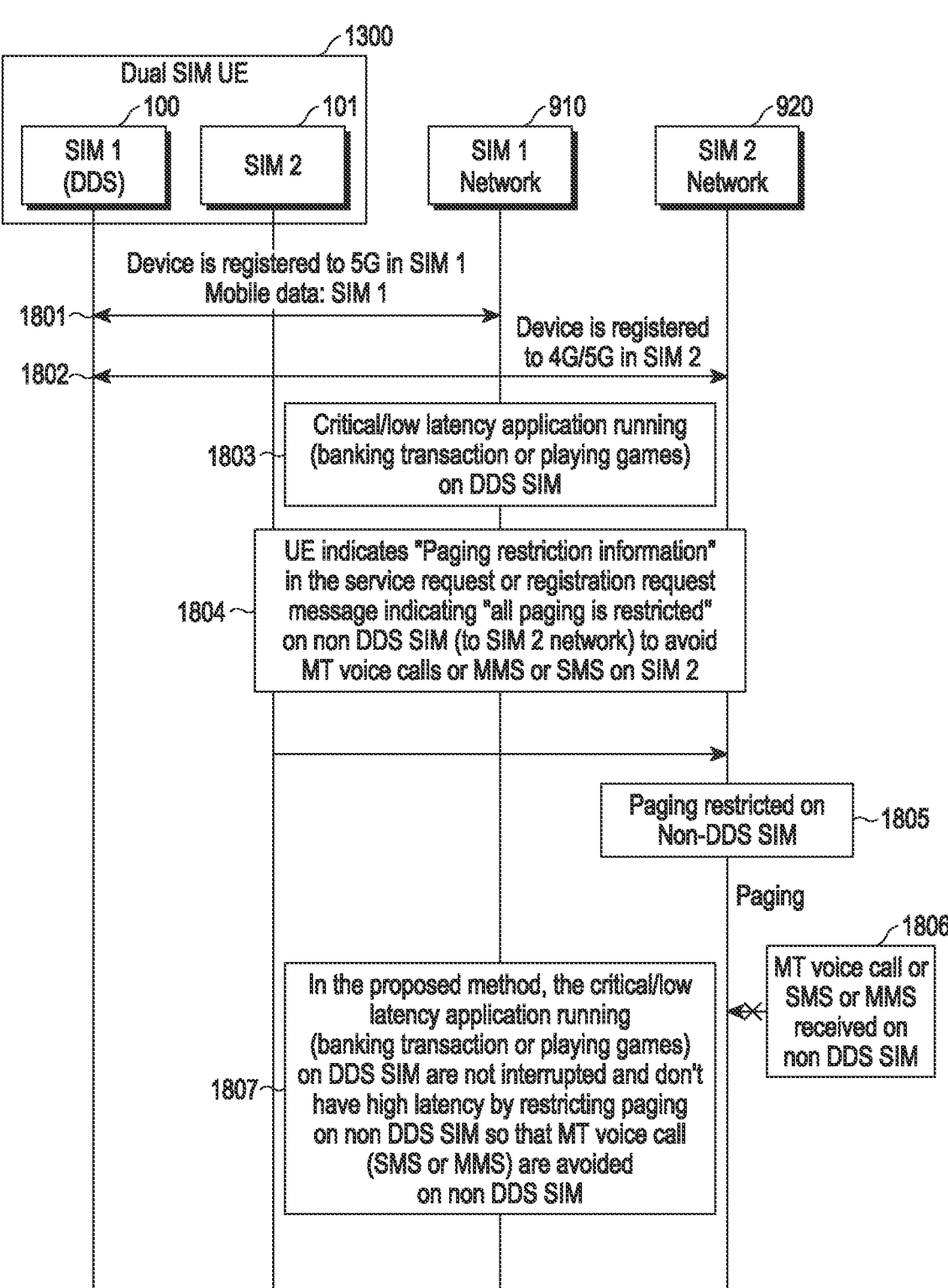
FIG. 18 is a sequence diagram illustrating a solution for critical or low latency applications interruption according to various embodiments.

FIG. 18 is a sequence diagram illustrating a solution for critical or low latency applications interruption according to various embodiments.

At (1801), the UE (1300) is registered to 5G via network (910) in SIM1 (100) and the mobile data is active in SIM1 (100).

At (1802), the UE (1300) is registered to 4G/5G via network (920) in SIM2 (101).

At (1803), a critical/low latency application is running (banking transaction or playing games) on the DDS SIM.

At (1804), UE (1300) indicates "Paging restriction information" in a service request or registration request message indicating "all paging is restricted" on non-DDS SIM (to the SIM2 (101) network) to avoid MT voice calls or MMS or SMS on SIM2 (101).

At (1805), the paging is restricted on the non-DDS SIM.

At (1806), an MT voice call or SMS or MMS is received on the non-DDS SIM.

At (1807), the running critical/low latency application (e.g., banking transaction or playing games) on the DDS SIM are not interrupted and high latency is reduced or avoided by restricting the paging on the non-DDS SIM so that MT voice calls (SMS or MMS) are avoided on the non-DDS SIM.

Figure 19:
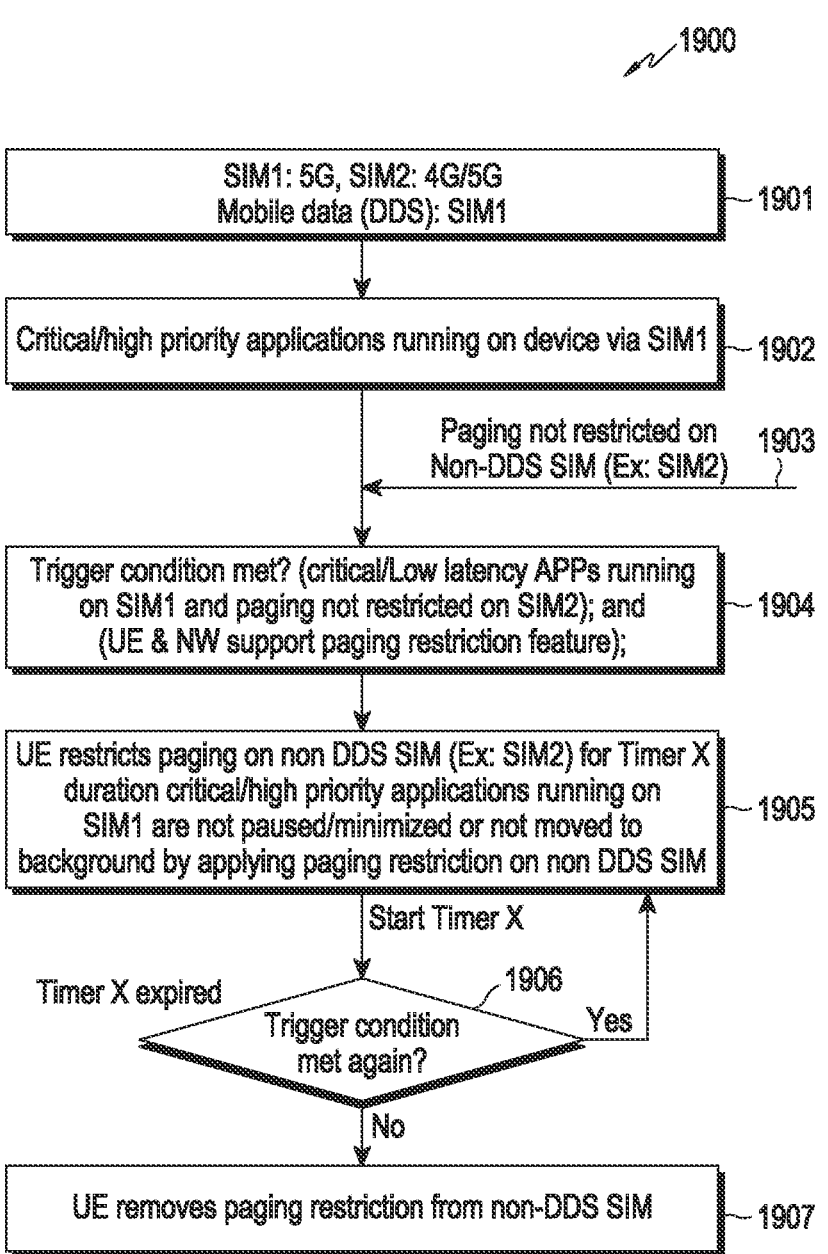
FIG. 19 is a flow chart illustrating a solution not to pause or move to background the critical applications when running on SIM1 according to various embodiments.

FIG. 19 is a flow chart 1900 illustrating a solution not to pause or move to background critical applications when running on SIM1 (100) according to various embodiments.

At (1901), the UE (1300) determines SIM1 (100) as 5G and SIM2 (101) as 4G/5G.

At (1902), critical/low-latency applications are running on UE (1300) via SIM1 (100).

At (1903), paging is not restricted on SIM2 (101).

At (1904), the UE (1300) determines whether a trigger condition is met (e.g., critical/low-latency applications running on SIM1 (100) and paging not restricted on SIM2 (101)); and whether UE (1300) and the network support a paging restriction feature.

If so, at (1905), UE (1300) restricts paging on the non-DDS SIM (e.g., SIM2 (101)) for the duration of Timer X and critical/high priority applications running on SIM1 (100) are not paused/minimized or not moved to background as a result of applying the paging restriction on the non-DDS SIM.

When the timer X expires, at (1906), the UE (1300) determines again whether the trigger condition is met, and, if so, the operation returns to (1905).

If the trigger condition is not met again, at (1907), the UE (1300) removes the paging restriction from the non-DDS SIM.

Figure 20:
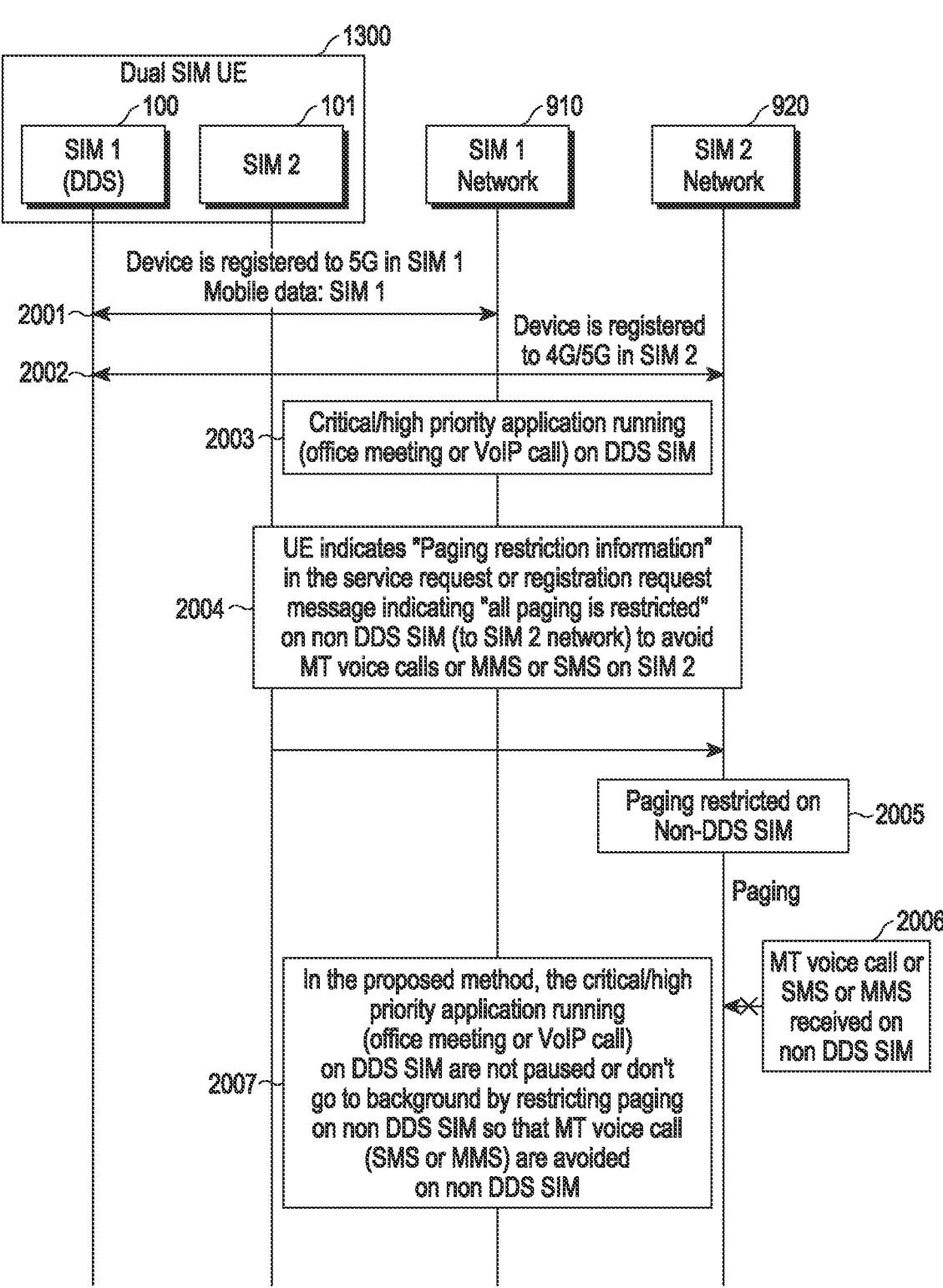
FIG. 20 is a sequence diagram illustrating a solution not to pause or move to background the critical applications when running on SIM1 according to various embodiments.

FIG. 20 is a sequence diagram illustrating a solution not to pause or move to background the critical applications when running on SIM1 (100) according to various embodiments.

At (2001), UE (1300) is registered to 5G via network (910) in SIM1 (100) and the mobile data is active in SIM1 (100).

At (2002), the UE (1300) device is registered to 4G/5G via network (920) in SIM2 (101).

At (2003), a critical/low latency application is running (e.g., office meeting or VoIP call) on the DDS SIM.

At (2004), UE (1300) indicates "Paging restriction information" in a service request or registration request message indicating "all paging is restricted" on the non-DDS SIM (to SIM2 (101) via network (920)) to avoid MT voice calls or MMS or SMS on SIM2 (101).

At (2005), the paging is restricted on the non-DDS SIM.

At (2006), an MT voice call or SMS or MMS is received on the non-DDS SIM.

At (2007), the critical/high priority application (e.g., office meeting or VoIP call) running on the DDS SIM is not paused or does not go to background by restricting paging on the non-DDS SIM so that MT voice call (SMS or MMS) are avoided on the non-DDS SIM.

Figure 21:
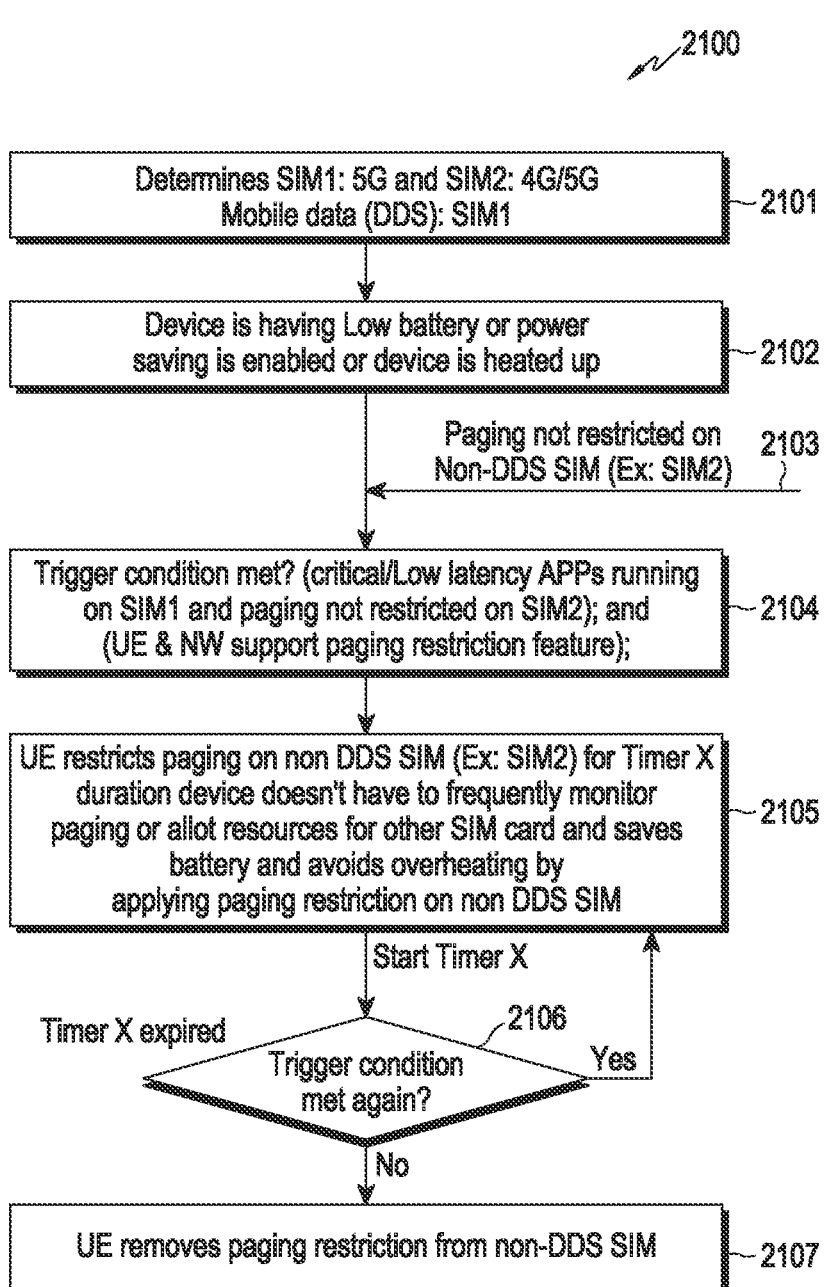
FIG. 21 is a flow chart illustrating a solution with low power or resource consumption and to avoid overheating according to various embodiments.

FIG. 21 is a flow chart 2100 illustrating a solution with low power or resource consumption and to avoid overheating according to various embodiments.

At (2101), the UE (1300) determines SIM1 (100) as 5G and SIM2 (101) as 4G/5G.

At (2102), the UE (1300) operates with a low battery or power saving is enabled or the device is heated up.

At (2103), paging not restricted on the non-DDS SIM (e.g., SIM2 (101)).

At (2104), UE (1300) determines whether a trigger condition is met (e.g., critical/low-latency applications running on SIM1 (100) and paging not restricted on SIM2 (101)); and whether UE (1300 and the network support a paging restrictions feature.

If the trigger condition is met, at (2105), UE (1300) restricts paging on the non-DDS SIM (e.g., SIM2 (101)) for the duration of timer X and the UE (1300) does not have to frequently monitor paging or allot resources for the other SIM card, thereby saving battery and avoiding or reducing over-heating due to the paging restriction on the non-DDS SIM being applied.

At the expiration of Timer X, at (2106), the UE (1300) determines whether the trigger condition met again or, if so, the operation returns to (2105).

If the trigger condition is not met again, at (2107), the UE (1300) removes the paging restriction from the non-DDS SIM.

Figure 22:
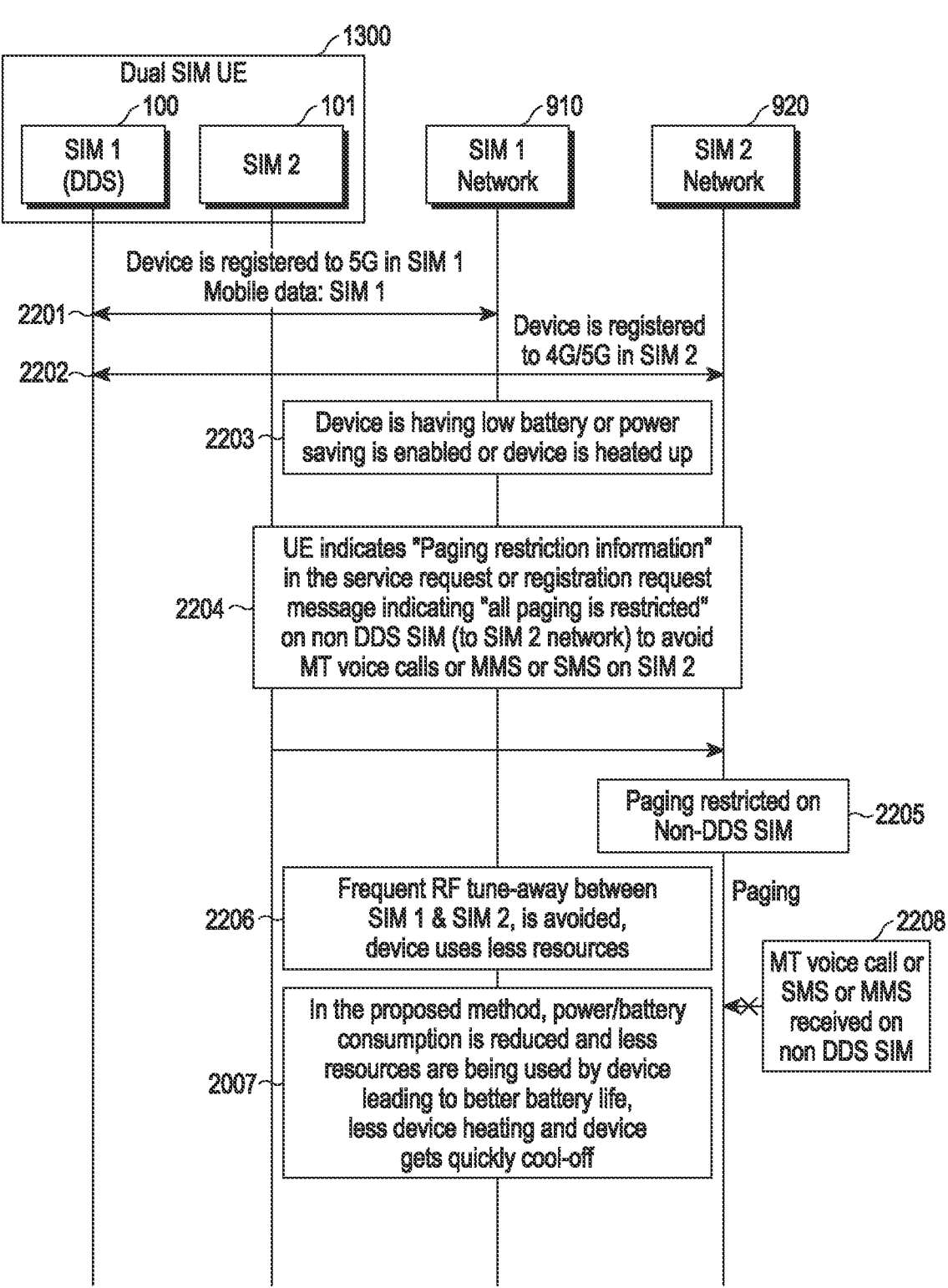
FIG. 22 is a sequence diagram illustrating a solution with low power or resource consumption and to avoid overheating according to various embodiments.

FIG. 22 is a sequence diagram illustrating a solution with low power or resource consumption and to avoid over-heating according to various embodiments.

At (2201), UE (1300) is registered to 5G via network (910) in SIM1 (100) and the mobile data is active in SIM1 (100).

At (2202), UE (1300) is registered to 4G/5G via network (920) in SIM2 (101).

At (2203), UE (1300) is in a low battery state or power saving is enabled or is heated up.

At (2204), UE (1300) indicates "paging restriction information" in the service request or registration request message indicating "all paging is restricted" on the non-DDS SIM (to SIM2 (101) via network (920)) to avoid MT voice calls or MMS or SMS on SIM2 (101).

At (2205), the paging is restricted on the non-DDS SIM.

At (2206), frequent RF tune-away between SIM1 (100) and SIM2 (101), is avoided, and UE (1300) uses fewer resources.

At (2207), the fewer resources lead to better battery life, less device heating and reduced cool-off time.

At (2208), the MT voice call or SMS or MMS received on the non-DDS SIM.

Figure 23:
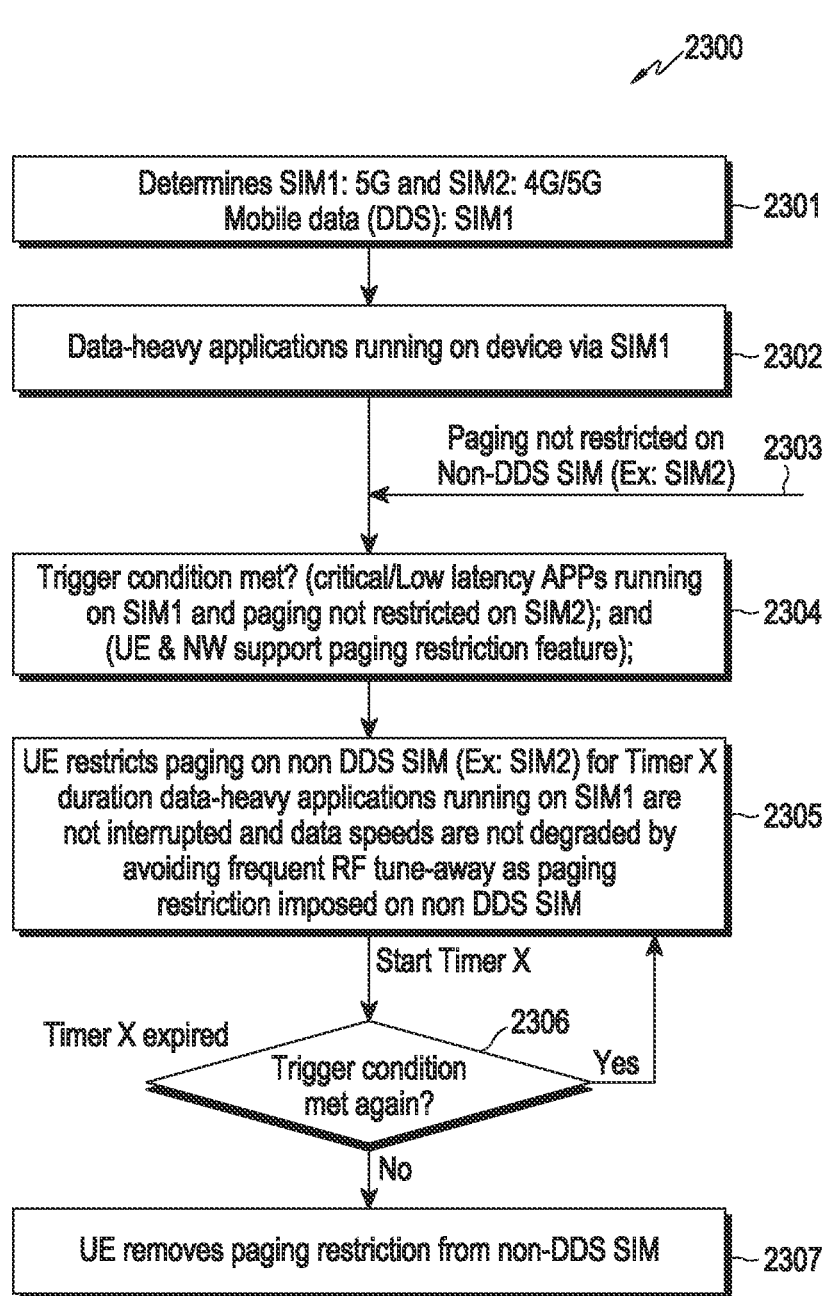
FIG. 23 is a flow chart illustrating a solution with no data throughput degradation according to various embodiments.

FIG. 23 is a flow chart 2300 illustrating a solution with no (or reduced) data throughput degradation according to various embodiments.

At (2301), the UE (1300) determines SIM1 (100) as 5G and SIM2 (101) as 4G/5G.

At (2302), data-heavy applications are running on UE (1300) via SIM1 (100).

At (2303), paging not restricted on the non-DDS SIM (e.g., SIM2 (101)).

At (2304), the UE (1300) determines whether a trigger condition is met (e.g., critical/low-latency applications running on SIM1 (100) and paging not restricted on SIM2 (101)); and whether UE (1300) and the network support a paging restriction feature.

If the trigger condition is met, at (2305), UE (1300) restricts paging on the non-DDS SIM (e.g., SIM2 (101)) for the duration of timer X and data-heavy applications running on SIM1 (100) are not interrupted and data speeds are not degraded by frequent RF tune-aways because a paging restriction is imposed on the non-DDS SIM.

When the timer expires, at (2306), the UE (1300) determines whether the trigger condition is met again and, if so, the operation returns to (2305).

If the trigger condition is not met, at (2307), the UE (1300) removes the paging restriction from the non-DDS SIM.

Figure 24:
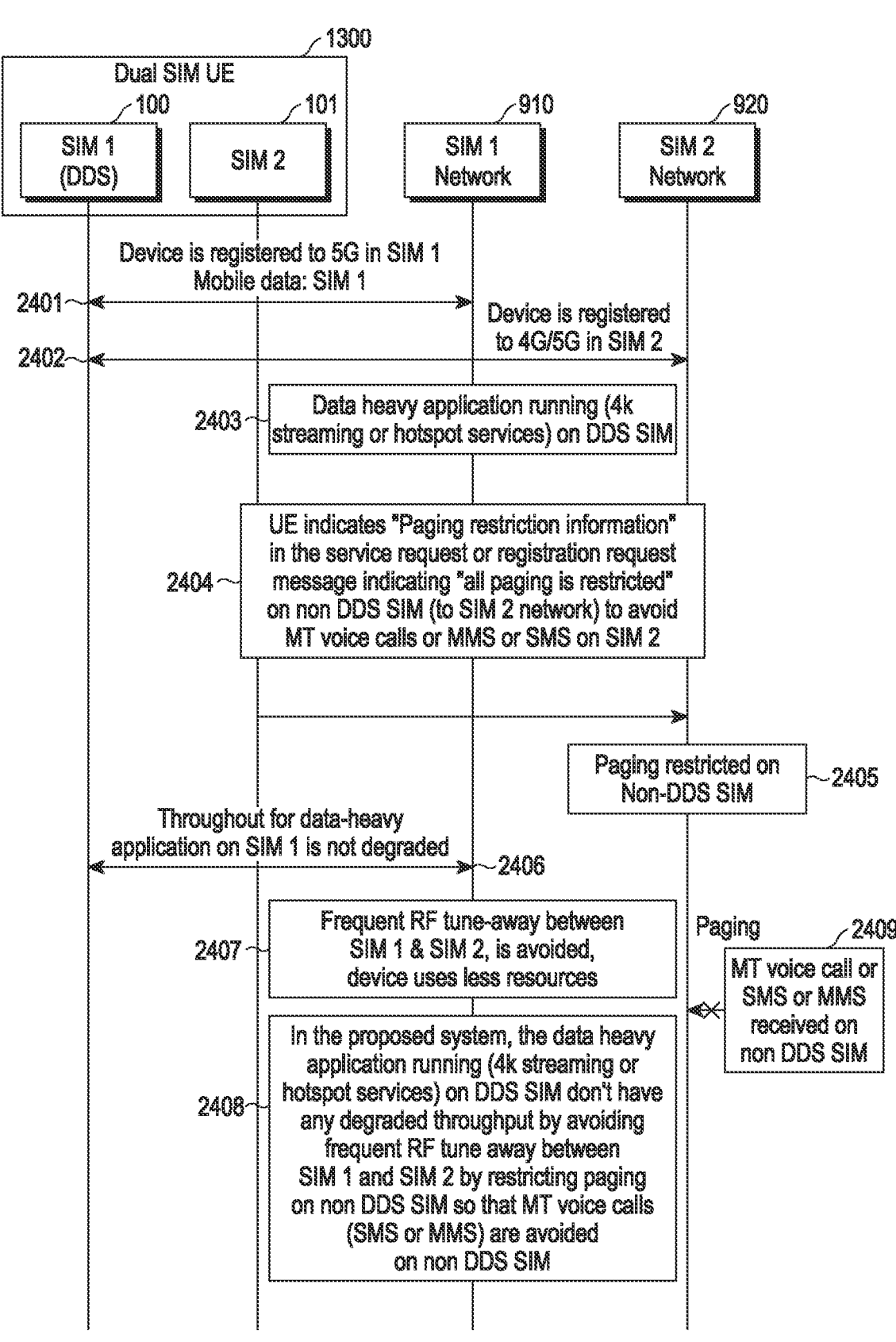
FIG. 24 is a sequence diagram illustrating a solution with no data throughput degradation according to various embodiments.

FIG. 24 is a sequence diagram illustrating a solution with no (or reduced) data throughput degradation according to various embodiments.

At (2401), UE (1300) is registered to 5G via network (910) in SIM1 (100) and the mobile data is active in SIM1 (100).

At (2402), UE (1300) is registered to 4G/5G via network (920) in SIM2 (101).

At (2403), UE (1300) runs a data heavy application (e.g., 4 k streaming or hotspot services) on the DDS SIM.

At (2404), UE (1300) indicates "Paging restriction information" in the service request or registration request message indicating "all paging is restricted" on the non-DDS SIM (to SIM2 (101) via network (920)) to avoid MT voice calls or MMS or SMS on SIM2 (101).

At (2405), paging is restricted on the non-DDS SIM.

At (2406), the throughout for the data-heavy application on SIM1 (100) is not degraded.

At (2407), frequent RF tune-away between SIM1 (100) and SIM2 (101) is avoided, and UE (1300) may use fewer resources.

At (2408), the data heavy application (e.g., 4 k streaming or hotspot services) running on the DDS SIM does not have degraded throughput because frequent RF tune away between SIM1 (100) and SIM2 (101) is avoided by restricting paging on the non-DDS SIM so that MT voice calls (SMS or MMS) are avoided on the non-DDS SIM.

At (2409), the MT voice call or SMS or MMS is received on the non-DDS SIM.

FIG. 25 is a schematic diagram illustrating the paging restriction applied or triggered by a user or by any of the module in the device according to various embodiments herein.

The systems and methods of the disclosure are applied/controlled using any user interface/user menu which may be displayed to the user, for example, under any of a "Settings" menu.

In an embodiment, the systems and methods of the disclosure are applied/triggered by the user or by any of the modules in the device (e.g., either from application processor side (AP side) or from communication processor side (CP side) or by interaction between AP-CP sides or between any modules within the device).

In an embodiment, user may select a set of applications in which transactions do not need to be interrupted by activities of another SIM card. The AP may notify the CP to apply paging restrictions whenever a user opens one of the pre-set applications. Further, the user may be given the option to select the feature per SIM or for the entire UE (1300). User selection may be set/applied via any menu or app such as "DND app" which will enable paging restrictions when app is launched.

In an embodiment, the systems and methods of the disclosure may be enabled/disabled based on the user's consent or approval and the user's consent may be obtained for every time or may be obtained on a one-time basis.

In an embodiment, an AI-based engine is designed in the UE (1300) to help UE (1300) to determine the criticality of applications running on the device or on the DDS SIM and accordingly restrict paging on the non-DDS SIM (or on both the SIMs if Wi-Fi is connected) to provide a seamless user experience.

In an embodiment, whenever the UE (1300) is connected to Wi-Fi and when the critical applications are running or any trigger condition is met and paging is not restricted, UE (1300) may restrict paging on the available SIM card(s) (one or more SIM cards) to avoid interruptions of critical applications due to paging for MT voice calls (or SMS or MMS).

In an embodiment, in a single SIM 5G device with Wi-Fi connected, if critical applications are running or any trigger condition is met and paging is not restricted, UE (1300) may restrict paging on the available SIM card to avoid interruptions of critical applications due to paging for MT voice calls (or SMS or MMS).

In an embodiment, whenever any critical application is running or any trigger condition is met on one or more of the available devices (from the set of devices with a common subscription), paging restriction may be applied to those devices and a user may still receive the MT services (call/SMS/MMS/data) on another device.

In an embodiment, the systems and method of the disclosure are applicable for both 5G (NR or 5G core (5GC)) and 4G (LTE or evolved packet core (EPC)).

The systems and methods of the disclosure may provide advantages including, but not limited to, the following.

The systems and methods of the disclosure mays provide a better and seamless 5G user experience.

The systems and methods of the disclosure may provide enhanced battery life by reducing power consumption.

The systems and methods of the disclosure may provide enhanced data performance in terms of low latency and high data throughput.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within scope of the embodiments as described herein.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for managing paging restrictions in a multi-subscriber identity module (SIM) user equipment (UE) in a wireless network, the method comprising:

detecting, by the UE, whether a first SIM of the UE is configured for a dedicated data subscription;

detecting, by the UE, an occurrence of a trigger condition in connection with at least one of the first SIM and at least one second SIM of the UE and determining, by the UE, that a paging is not restricted on the at least one second SIM;

enabling, by the UE, a paging restriction to the at least one second SIM based on the occurrence of the trigger condition and the determination that the paging is not restricted on the at least one second SIM; and indicating, by the UE to a network entity connected to the at least one second SIM, paging restriction information for the paging restriction to the at least one second SIM.

2. The method as claimed in claim 1, further comprising:

initiating, by the UE, a timer in parallel to the enabling of the paging restriction for a particular time period; and disabling, by the UE, the paging restriction based on that the trigger condition does not persist after expiry of the timer, wherein the initiating of the timer comprises:

determining, by the UE, whether paging on the at least one second SIM is restricted;

determining whether the timer is expired based on the determination that the paging is not restricted on the at least one second SIM;

detecting a critical data service or an application running on the first SIM and the paging not being restricted on the at least one second SIM; and initiating the timer for restricting paging on the at least one second SIM.

3. The method as claimed in claim 1, wherein the trigger condition comprises a critical data service or application running on the first SIM and paging being not restricted for mobile terminal (MT) services on the at least one second SIM, wherein the critical data service or application comprises at least one of an office meeting application, a banking transaction, a banking transaction application, a gaming service, a hotspot application, a hotspot service, a 4 k streaming applications, a voice over internet protocol (VoIP) application-based call, a low-latency based application, or a data-oriented application, wherein the MT services comprise voice calls, short messaging service (SMS), multimedia messaging service (MMS), or integrated management system (IMS).

4. The method as claimed in claim 1, wherein the detecting of the occurrence of the trigger condition comprises:

determining, by the UE, whether the UE and the network entity support a paging restriction feature;

determining, by the UE, whether a critical data service or an application is running in the UE and the paging on the at least one second SIM is not restricted based on the UE and the network entity being determined to support the paging restriction feature; and disabling the paging restriction based on the UE and the network entity being determined to not support the paging restriction feature.

5. The method as claimed in claim 1, wherein the enabling of the paging restriction comprises:

determining, by the UE, whether a critical data service or an application running in the UE is paused or minimized;

initiating, by the UE, a timer for restricting paging on the at least one second SIM based on the critical data service or the application being not paused or not minimized;

determining, by the UE, whether the timer for restricting paging on the at least one second SIM is expired and the critical data service or the application is paused or minimized;

removing the paging restriction from the at least one second SIM based on the timer for restricting paging on the at least one second SIM being expired and the critical data service or the application being paused or minimized; and enabling the paging restriction on the at least one second SIM based on the timer for restricting paging on the at least one second SIM being not expired or the critical data service or the application being not paused or not minimized.

6. The method as claimed in claim 1, further comprising:

receiving, by the UE, a selection of at least one application in a user interface of the UE for designating the selected at least one application as a critical data service or an application;

determining, by the UE, whether the selected at least one application is running;

initiating the paging restriction on the at least one second SIM based on the selected at least one application being running; and disabling the paging restrictions on the at least one second SIM based on the selected at least one application being not running.

7. The method as claimed in claim 1, further comprising:

determining, by the UE, that the UE is running at least one data-heavy application, the UE is running a low latency application through the first SIM, the UE is running a high priority application through the first SIM, the UE has a low battery state, the UE has power saving enabled, or the UE is over heated;

determining, by the UE, the paging restriction is not enabled;

detecting, by the UE, whether the trigger condition is met; and enabling the paging restriction to the at least one second SIM based on the trigger condition being meet.

8. The method as claimed in claim 1, wherein the paging restriction provides at least one of low latency, high data throughput and avoidance of frequent RF tune-away between the multi-SIMs.

9. The method as claimed in claim 3, wherein the UE indicates paging restriction information to the network entity through the at least one second SIM in a form of a service request or a registration request message to stop receiving the MT services in the second SIM.

10. The method as claimed in claim 1, further comprising:

identifying, by the UE, a critical data service or an application running on the UE based on an artificial intelligence (AI)-based engine;

determining, by the UE, whether the UE is connected to a Wi-Fi network; and enabling, by the UE, the paging restriction to at least one of the first SIM and the at least one second SIM based on the UE being connected to the Wi-Fi network.

11. A multi-subscriber identity module (SIM) user equipment (UE) for managing paging restrictions in a wireless network, the UE comprising:

memory storing instructions; and at least one processor, comprising processing circuitry, operably coupled to the memory, wherein the instructions, when executed by the at least one processor individually of collectively, cause the UE to:

detect whether a first SIM of the UE is configured for a dedicated data subscription;

detect an occurrence of a trigger condition in connection with at least one of the first SIM and at least one second SIM of the UE and determining, by the UE, that a paging is not restricted on the at least one second SIM;

enable a paging restriction to the at least one second SIM based on the occurrence of the trigger condition and the determination of the paging being not restricted on the at least one second SIM; and indicate, to a network entity connected to the at least one second SIM, paging restriction information for the paging restriction to the at least one second SIM.

12. The UE as claimed in claim 11, wherein the instructions, when executed by the at least one processor individually or collectively, cause the UE to:

initiate a timer in parallel to enabling the paging restriction for a particular time period; and disable the paging restriction based on that the trigger condition does not persist after expiry of the timer, wherein, to initiate of the timer, the instructions, when executed by the at least one processor individually or collectively, cause the UE to:

determine whether the paging on the at least one second SIM is restricted;

determine whether the timer is expired based on the determination that the paging is not restricted on the at least one second SIM;

detect a critical data service or application running on the first SIM and the paging not being restricted on the at least one second SIM; and initiate the timer for restricting paging on the at least one second SIM.

13. The UE as claimed in claim 11, wherein the trigger condition comprises a critical data service or application running on the first SIM and paging not being restricted for mobile terminal (MT) services on the at least one second SIM, wherein the critical data service or application comprises at least one of an office meeting app, a banking transaction, a banking transaction apps, a gaming service, a hotspot app, a hotspot service, a 4 k streaming app, a voice over internet protocol (VoIP) application-based call, a low-latency based application, or a data-oriented application, wherein the MT services comprises voice calls, short messaging service (SMS), multimedia messaging service (MMS), or integrated management system (IMS).

14. The UE as claimed in claim 11, wherein, to detect the occurrence of the trigger condition, the instructions, when executed by the at least one processor individually or collectively, cause the UE to:

determine whether the UE and the network entity support a paging restriction feature;

determining whether a critical data service or an application is running in the UE and a paging on the at least one second SIM is not restricted based on the UE and the network entity being determined to support the paging restriction feature; and disabling the paging restriction based on the UE and the network entity being determined to not support the paging restriction feature.

15. The UE as claimed in claim 11, wherein, to enabling the paging restriction, the instructions, when executed by the at least one processor individually or collectively, cause the UE to:

determine whether a critical data service or an application running in the UE is paused or minimized;

initiate a timer for restricting paging on the at least one second SIM based on the critical data service or the application being not paused or not minimized;

determine whether the timer for restricting paging on the at least one second SIM is expired and the critical data service or the application is paused or minimized;

remove the paging restriction from the at least one second SIM based on the timer for restricting paging on the at least one second SIM being expired and the critical data service or the application being paused or minimized; and enable the paging restriction on the at least one second SIM based on the timer for restricting paging on the at least one second SIM being not expired or the critical data service or the application being not paused or not minimized.

16. The UE as claimed in claim 11, wherein the instructions, when executed by the at least one processor individually or collectively, cause the UE to:

receive a selection of at least one application in a user interface of the UE for designating the selected at least one application as a critical data service or an application;

determine whether the selected at least one application is running;

initiate the paging restriction on the at least one second SIM based on the selected at least one application being running; and disable the paging restriction on the at least one second SIM based on the selected at least one application being not running.

17. The UE as claimed in claim 14, wherein the instructions, when executed by the at least one processor individually or collectively, cause the UE to:

determine that at least one data-heavy application is running, a low latency application is running through the first SIM, a high priority application is running through the first SIM, a low battery state exists, a power saving operation is enabled, or an over-heating state exists;

determine the paging restriction is not enabled;

detect whether the trigger condition is met; and enable the paging restriction to the at least one second SIM based on the trigger condition being meet.

18. The UE as claimed in claim 11, wherein the paging restriction provides at least one of low latency, high data throughput and avoidance of frequent RF tune-away between the multi-SIM.

19. The UE as claimed in claim 13, wherein the UE indicates paging restriction information to the network entity through the at least one second SIM in the form of a service request or a registration request message to stop receiving the MT services in the second SIM.

20. The UE as claimed in claim 11, wherein the instructions, when executed by the at least one processor individually or collectively, cause the UE to:

identify a critical data service or an application running on the UE based on an artificial intelligence (AI)-based engine;

determine whether the UE is connected to a Wi-Fi network; and enable the paging restriction to at least one of the first SIM and the at least one second SIM based on the UE being connected to the Wi-Fi network.

* * * * *